US012725129B2

(12) United States Patent
Lalonde

(10) Patent No.: US 12,725,129 B2
(45) Date of Patent: Sep. 1, 2026

(54) NON-TRANSITORY COMPUTER-READABLE MEDIUM AND SYSTEM RELATING TO PURCHASING DECISION MAKING

(71) Applicant: Benoit Lalonde, Orleans (CA)

(72) Inventor: Benoit Lalonde, Orleans (CA)

(73) Assignee: Benoit Lalonde, Oreleans (CA)

(*) Notice: Subject to any disclaimer, the term of this patent is extended or adjusted under 35 U.S.C. 154(b) by 0 days.

(21) Appl. No.: 17/157,455

(22) Filed: Jan. 25, 2021

(65) Prior Publication Data

US 2021/0142295 A1 May 13, 2021

Related U.S. Application Data

(63) Continuation-in-part of application No. 15/568,305, filed as application No. PCT/CA2016/000110 on Apr. 12, 2016, now abandoned.

(60) Provisional application No. 62/154,780, filed on Apr. 30, 2015.

(51) Int. Cl.

*G06Q 30/00* (2023.01)
*G06Q 10/20* (2023.01)
*G06Q 30/0601* (2023.01)
*G06Q 10/0875* (2023.01)

(52) U.S. Cl.

CPC ......... *G06Q 10/20* (2013.01); *G06Q 30/0633* (2013.01); *G06Q 10/0875* (2013.01)

(58) Field of Classification Search

CPC ... G06Q 30/06–08; G06Q 10/20; G06Q 10/30
See application file for complete search history.

(56) References Cited

U.S. PATENT DOCUMENTS 7,636,676 B1 * 12/2009 Wolery .............. G06Q 30/0611 705/26.4
10,086,782 B1 * 10/2018 Konrardy ............ G06F 16/2455
10,540,529 B1 * 1/2020 Bondarenko ........ G06K 7/1417
2004/0073434 A1 4/2004 Volquardsen et al.
2005/0125261 A1 * 6/2005 Adegan .................. G06Q 40/08 705/4
2006/0064393 A1 3/2006 Orr (Continued)

OTHER PUBLICATIONS

Zeydan, Mithat, Cüneyt Çolpan, and Cemal Çobanoğlu. "A combined methodology for supplier selection and performance evaluation." Expert systems with applications 38.3 (2011): 2741-2751. (Year: 2011).*

(Continued)

*Primary Examiner* — Jeffrey A. Smith
*Assistant Examiner* — Kennedy Gibson-Wynn
(74) *Attorney, Agent, or Firm* — GableGotwals

(57) ABSTRACT

A system and method of vehicle parts to effect a repair on a vehicle is provided. The parts selected for a repair are determined based upon characteristics associated with a client, owner of the vehicle, of a service center. The parts are selected based upon the characteristics in comparison to metrics associated with the parts. The parts that are selected by the client for the repair can then be utilized to generate part performance metrics and also be associated with vehicles on which they were utilized. The selection and identification of parts can be geographically based to account for environmental conditions which can impact performance of a particular part.

14 Claims, 22 Drawing Sheets

(56) References Cited

U.S. PATENT DOCUMENTS

| | | | | |
|---|---|---|---|---|
| 2006/0184383 | A1 | 8/2006 | Davis et al. | |
| 2009/0018859 | A1 | 1/2009 | Purifoy et al. | |
| 2009/0062978 | A1 | 3/2009 | Picard | |
| 2009/0313035 | A1 | 12/2009 | Esser et al. | |
| 2012/0136527 | A1* | 5/2012 | McQuade | G06Q 30/08 705/26.4 |
| 2014/0279258 | A1 | 9/2014 | Swinson et al. | |
| 2015/0142257 | A1* | 5/2015 | Merg | G07C 5/008 701/31.5 |
| 2016/0239867 | A1 | 8/2016 | Sinha et al. | |
| 2016/0307247 | A1* | 10/2016 | Sells | G06Q 30/0611 |

OTHER PUBLICATIONS

Cohen, Morris A., Narendra Agrawal, and Vipul Agrawal. "Winning in the aftermarket." Harvard business review 84.5 (2006): 129. (Year: 2006).*

Miguel, Paulo A. Chauchick, et al. "Assessment of service quality dimensions: a study in a vehicle repair service chain." PC o. Service and EurOMA (Eds.), Conference New challenges in service operations, London UK. 2007. (Year: 2007).*

M. S. Lebold, B. Murphy, K. Reichard, P. Sisa and J. Gaines, "Using wireless sensor technologies for sense and respond logistic applications," 2006 IEEE Aerospace Conference, Big Sky, MT, USA, 2006, pp. 9 pp.-, doi: 10.1109/AERO.2006.1655948. (Year: 2006).*

A. Maity, D. Zaremby, D. McMullen and J. Gomez, "Automated scheduling using Condition Based Maintenance," 2011 IEEE Conference on Prognostics and Health Management, Denver, CO, USA, 2011, pp. 1-8, doi: 10.1109/ICPHM.2011.6024331. (Year: 2011).*

* cited by examiner

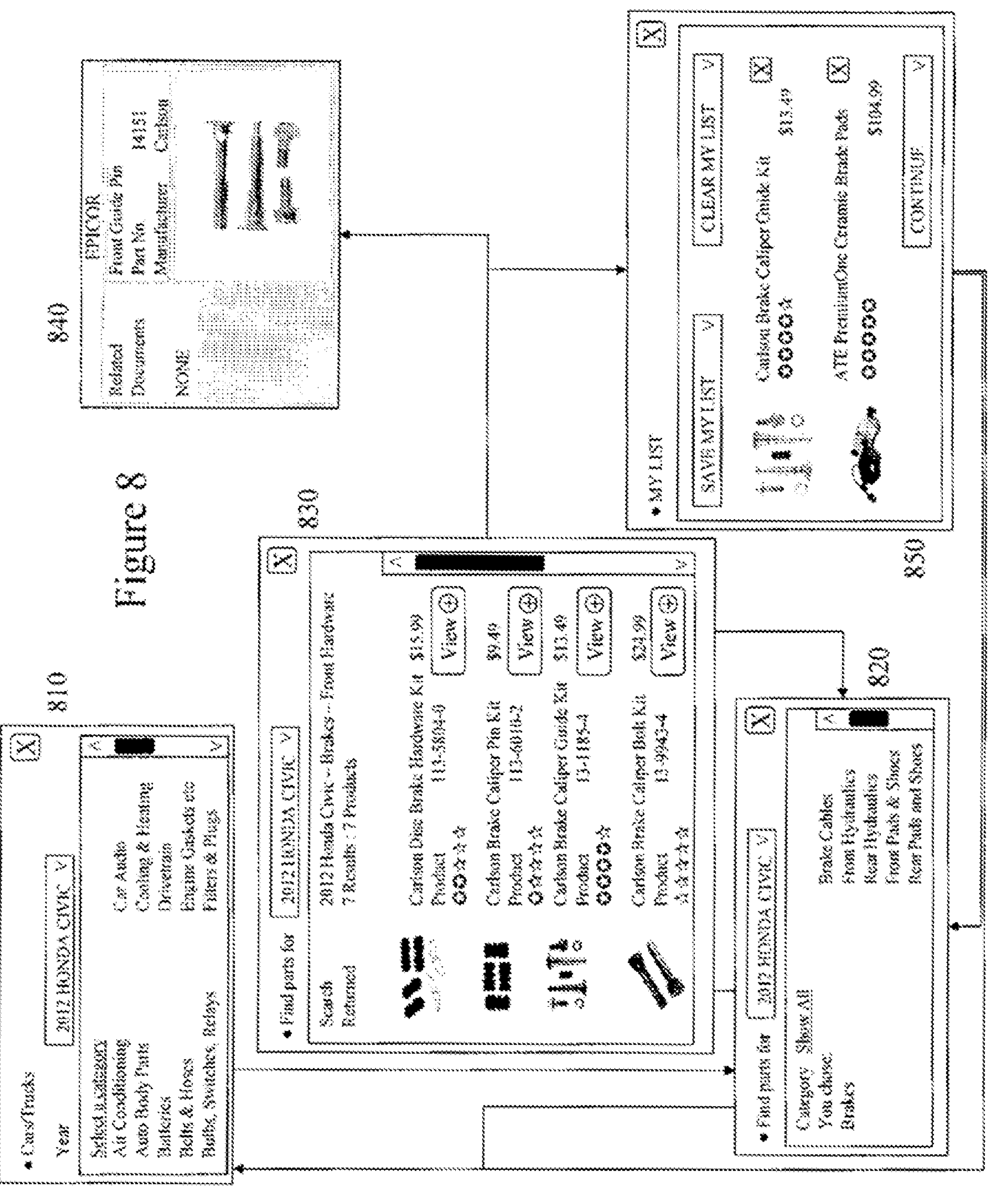

Figure 8
810
Cars/Trucks
Year
2012 HONDA CIVIC
Select a category
Air Conditioning
Auto Body Parts
Batteries
Belts & Hoses
Bulbs, Switches, Relays
Car Audio
Cooling & Heating
Drivetrain
Engine Gaskets etc
Filters & Plugs
820
Find parts for
2012 HONDA CIVIC
Category Show All
You chose:
Brakes
Brake Cables
Front Hydraulics
Rear Hydraulics
Front Pads & Shoes
Rear Pads and Shoes
830
Find parts for
2012 HONDA CIVIC
Search Returned
2012 Honda Civic – Brakes – Front Hardware
7 Results : 7 Products
Carlson Disc Brake Hardware Kit $15.99
Product 113-5804-0
View
Carlson Brake Caliper Pin Kit $9.49
Product 113-6010-2
View
Carlson Brake Caliper Guide Kit $13.49
Product 13-1185-4
View
Carlson Brake Caliper Bolt Kit $24.99
Product 13-9943-4
View
840
Related Documents
NONE
EPICOR
Front Guide Pin
Part No. 14151
Manufacturer Carlson
850
MY LIST
SAVE MY LIST
CLEAR MY LIST
Carlson Brake Caliper Guide Kit
$13.49
ATE PremiumOne Ceramic Brake Pads
$104.99
CONTINUE

1600

1700

NON-TRANSITORY COMPUTER-READABLE MEDIUM AND SYSTEM RELATING TO PURCHASING DECISION MAKING

CROSS-REFERENCE TO RELATED APPLICATIONS

The present application is a continuation-in-part of U.S. patent application Ser. No. 15/568,305 filed Oct. 20, 2017, which is the National Phase of PCT Application No. PCT/CA2016/000110 filed 12 Apr. 2016 which claims priority to U.S. Provisional Application No. 62/154,780 filed 30 Apr. 2015, each of which are hereby incorporated by reference for all purposes.

FIELD OF THE INVENTION

This invention relates to vehicle repair parts and more particularly to providing contextually relevant vehicle repair parts information.

BACKGROUND OF THE INVENTION

When vehicles must be repaired, the repair may, or may not, be covered by a warranty on the equipment. Thus, it is typically first determined whether the vehicle is still under warranty and, if so, what components are covered thereby. For example, it is now common for manufacturers to apply warranties of different length to different components or systems of an item of equipment. If a repair is fully covered by a warranty, the cost of the repair is generally of no concern to the equipment owner, lessee, or other party responsible for or interested in the equipment (all of which are hereinafter considered to be a “equipment owner” for purposes of the present invention), because the repair will be paid for by the equipment manufacturer or an insurance carrier. However, if the entire warranty on equipment in need of repair has expired, or if the particular component(s) in need of repair or replacement is no longer covered by the warranty, the cost of the repair is of much greater interest to the equipment owner as, in this situation, it is the equipment owner that w ill likely pay for the repair.

The problem with the latter of the above-described situations is that a typical vehicle owner has little or no idea what a particular repair should cost nor of the tradeoffs inherent in repairing it. Even with simple repairs, there may be component purchase costs, component disposal costs, removal and installation charges, and several other possible expenses that may be incurred by the vehicle owner. With more complex repairs, which are not necessarily unusual with respect to today’s more complex vehicles, the explanation of repairs and their associated costs may perplex even knowledgeable equipment enthusiasts. Vehicle replacement parts can be original equipment manufacturer (OEM) parts or aftermarket parts. Each of the parts can have different manufacturers, varying grades of quality and associated prices. The selection of which parts are utilized for the repair are typically at the discretion of the repair facility and can results in a wide range of variability in cost and performance.

In this situation, the vehicle owner is left substantially at the mercy of the vehicle dealer or other repair facility to which the ailing vehicle has been taken. The vehicle owner must trust that the repair facility will quote an honest and fair cost for the work to be done and trust the appropriateness of the parts selected to effect the repair. The cost and performance of the parts can be impacted by the particular make and made of the vehicle, usage of the vehicle, and geographic and environmental conditions that vehicle is exposed to. In the vehicle repair process multiple replacement parts can be available of varying grades, prices, warranty and performance. Insight in the context under which the consumer selected that the parts for repair is missing. Suppliers and manufacturers must rely on general historical trends for manufacturing and stocking parts with little comprehension as to what factors driving sales.

Therefore there is a need for enabling contextual part selection for vehicle repairs which provides options that better meet the requirements of a customer and their vehicle.

BRIEF DESCRIPTION OF THE DRAWINGS

Embodiments of the present invention will, now be described, by way of example only, with reference to the attached Figures, wherein:

FIG. 8 depicts contextually driven decision making process;

DTAILED DESCRIPTION

Figure 1A:
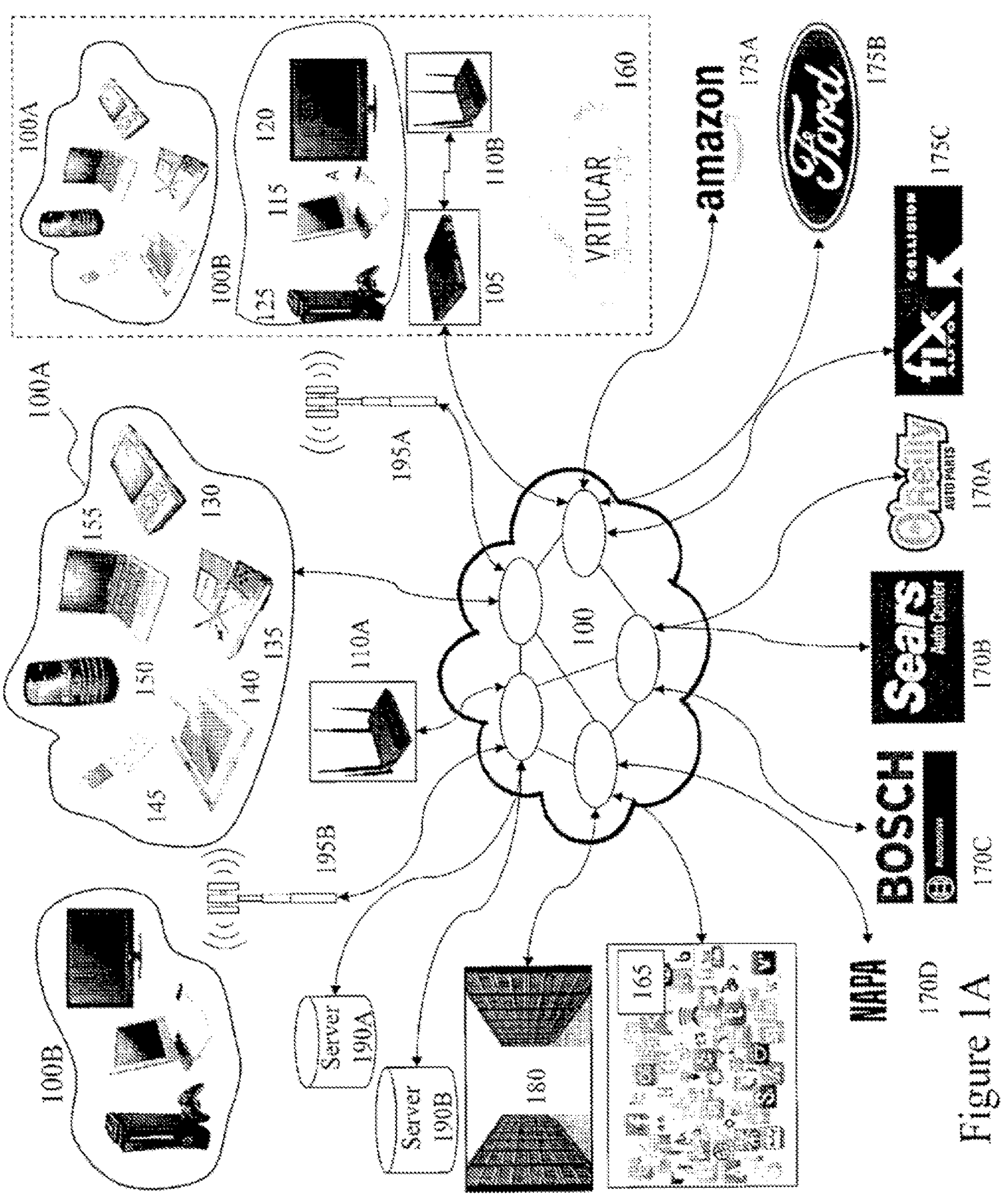
FIG. 1A depicts an example of a network environment within which embodiments of the invention are employed and exploited.

The present invention is directed to purchasing and more particularly to providing purchasers with contextually relevant information for informed decision making with respect to options available.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of work order generation to effect a vehicle repair. The method of work order generation also includes retrieving an electronic client profile identifying one or more client preferences metrics associated with the vehicle repair; identifying one or more vehicle parts required to effect the vehicle repair, the one or more vehicle parts retrieved from an inspection report; determining for each of the identified one or more vehicle parts associated supplier part identifiers matching at least one client preference metric by querying a plurality of supplier databases; generating an estimate presenting the supplier part identifiers associated with the one or more vehicle parts and transmitting the estimate to a client computing device; receiving selection of a subset of the supplier part identifiers through a network from the client computing device; and generating a work order from selected subset of supplier part identifiers. Other embodiments of this aspect include corresponding computer systems, apparatus, and computer programs recorded on one or more computer storage devices, each configured to perform the actions of the methods.

Implementations may include one or more of the following features. The method further including generating and storing collected performance data from associated with the identified one or more vehicle parts replaced on the vehicle by the subset of supplier part identifiers. Electronic client profile is selected from one or more of a group including price range, warranty, longevity, warranty, brand, and operating conditions. The supplier part identifiers is further selected upon a geographic location of the vehicle. The generated estimate includes at least two supplier part identifiers, where one of the two supplier part identifiers is selected. A closest match is selected when that part profile does not contain a metric matching a characteristic to the client profile. Determining for each of the identified one or more vehicle parts associated supplier part identifiers further includes retrieving a part profile where a characteristic in the part profile matched is matched to a characteristic in the client profile. The method further includes receiving performance data including identification of a failure mode or defect associated with the part and an associated vehicle. The second subset of supplier part identifiers can be correlated to client profile characteristics. Determining for each of the identified one or more vehicle parts associated supplier part identifiers matching one or more client preference metrics further includes comparing at least one part metric retrieved from a part profile. The supplier parts that are identified are dynamically changed based upon changes to selected client profile characteristics. The performance data is generated by: retrieving a part profile including a plurality of part metrics from a storage device; determining a vehicle brand and model associated with the retrieved part profile, where the vehicle brand and model are determined from previously received performance data; determining an approximate mileage associated with a failure of an associated part on the vehicle; determining for a geographic region a plurality of vehicles matching the determined vehicle brand and model and estimating a mileage cf the vehicles relative to the determine approximate mileage of the failure; and generating a supply profile identifying one or more subsets of vehicles based upon predicted data which will require the part within a defined time period. Implementations of the described techniques may include hardware, a method or process, or computer software on a computer-accessible medium.

One general aspect includes a system work order generation to effect a vehicle repair. The system work order generation also includes a processor; a storage device operatively coupled to the processor, the storage device containing: a plurality of vehicle part profiles, the profiles identifying a plurality of metrics associated with part selection; and a plurality of customer profiles identifying user preferences associated with characteristics. The system work order generation also includes a memory coupled to the processor, the memory containing computer readable instructions for maintaining: an inspection module for receiving inspection data associated with a vehicle, an estimation module for generating an estimate from the inspection data and an associated vehicle part profile and customer profile and generating a work order, a part profiler module for generating the plurality are part profiles based upon work orders and a plurality of part supplier data, a customer profiler module for generating the plurality of customer profiles based upon a received selection of preference associated with characteristics to determine part selection, and an analytics module for identifying vehicle part profile usage trends. Other embodiments of this aspect include corresponding computer systems, apparatus, and computer programs recorded on one or more computer storage devices, each configured to perform the actions of the methods.

One general aspect includes the system where the inspection module further receives performance data or an associated part on the vehicle. Other embodiments of this aspect include corresponding computer systems, apparatus, and computer programs recorded on one or more computer storage devices, each configured to perform the actions of the methods.

Implementations may include one or more of the following features. The system where the analytics module further performs; identification of a part failure mode and an associated usage indicator and identification of a vehicle brand and model associated with the failure, identification of one or more client characteristics associated with the selection of a part associated with generated work orders. The estimation module retrieves a selection of a subset of vehicle parts identified in an estimate where the selected vehicle parts are associated with a work order. The analytics module identifies a second subset of parts not selected for the work order and updates associated metrics in an associated parts profile. The part profiler module queries a plurality of part suppliers to retrieve part metrics for storage in the associated part profile. Implementations of the described techniques may include hardware, a method or process, or computer software on a computer-accessible medium.

One general aspect includes the system where the associated parts profile is updated when the associated part is included in the work order. Other embodiments of this aspect include corresponding computer systems, apparatus, and computer programs recorded on one or more computer storage devices, each configured to perform the actions of the methods.

One general aspect includes a method of predictive vehicle part supply profiling. The method of predictive vehicle part supply also includes retrieving a part profile including a plurality of part metrics from a storage device; determining a vehicle brand and model associated with the retrieved part profile, where the brand and model are determined from previously received performance data; determining an approximate mileage associated with a failure of an associated part on the vehicle; determining for a geographic region a plurality of vehicles matching the determined brand and model and estimating a mileage of the vehicles relative to the determine approximate mileage of the failure; and generating a supply profile identifying one or more subsets of vehicles based upon predicted data which will require the part within a defined time period. Other embodiments of this aspect include corresponding computer systems, apparatus, and computer programs recorded on one or more computer storage devices, each configured to perform the actions of the methods.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements w without departing from the spirit and scope as set forth in the appended claims.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PhD and/or PHD.

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A "third party" or "third party provider" as used herein may refer to, but is not limited to, a so-called "arm's length" provider of a service and/or a product to an enterprise and/or individual and I or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals who monitor, acquire, store, transmit, edit, process and analyze information/data either locally or remotely to the user wherein by their engagement with a service provider, third party provider, enterprise, social network, social media etc. via a dashboard, web service, website, software plug-in, software application, graphical user interface etc, accesses and uses a PURDE-FRA SAP according to an embodiment of the invention with respect to, for example, electronic content. This includes, but is not limited to, private individuals, employees of organizations and/or enterprises, members of community organizations, members of charity organizations, men, women, children, and teenagers, in its broadest sense the user may further include, but not be limited to, software systems, mechanical systems, robotic systems, android systems, etc. that may be characterized as having the ability to monitor, acquire, store, transmit, edit, process and analyze information/data and associate this to a field or fields within a PURDE-FRASAP according to an embodiment of the invention.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files.

Reference to "content information" as used herein may refer to, but is not limited to, any combination of content features, content serving constraints, information derivable from content features or content serving constraints (referred to as "content derived information"), and/or information related to the content (referred to as "content related information"), as well as an extension of such information (e.g., information derived from content related information).

Reference to a "document" as used herein may refer to, but is not limited to, any machine-readable and machine-storable work product. A document may be a file, a combination of files, one 01 more files with embedded links to other files, etc. The files may be of any type, such as text, audio, image, video, etc. Parts of a document to be rendered to a.i end user can be thought of as "content" of the document. A document may include "structured data" containing both content (words, pictures, etc.) and some indication of the meaning of that content (for example, e-mail fields and associated data, HTML tags and associated data, etc.). In the context of the Internet, a common document is a Web page. Web pages often include content and may include embedded information (such as meta-information, hyperlinks, etc.) and/or embedded instructions (such as Javascript, etc.). In many cases, a document has a unique, addressable, storage location and can therefore be uniquely identified by this addressable location such as a universal resource locator (URL) for example used as a unique address used to access information on the Internet.

"Document information" as used herein may refer to, but is not limited to, may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Referring to FIG. 1A there is depicted a network environment 100 within which embodiments of the invention may be employed supporting purchasing decision framework systems, applications and platforms (PURDE-FRASAPs) according to embodiments of the invention. Such PURDE-FRASAPs, for example supporting multiple channels and dynamic content. As shown first and second user groups 100A and 100B respectively interface to a telecommunications network 100. Within the representative telecommunication architecture, a remote central exchange 180 communicates with the remainder of a telecommunication service providers network via the network 100 which may include for example long-haul OC-48/OC-192 backbone elements, an OC-48 wide area network (WAN), a Passive Optical Network, and a Wireless Link. The central exchange 180 is connected via the network 100 to local, regional, and international exchanges (not shown for clarity) and therein through network 100 to first and second cellular APs 195A and 195B respectively which provide Wi-Fi cells for first and second user groups 100A and 100B respectively. Also connected to the network 100 are first and second Wi-Fi nodes 110A and 110B, the latter of which being coupled to network 100 via router 105. Second Wi-Fi node 110B is associated with Enterprise 160, e.g. VrtuCar, an Ottawa, Canada based car sharing enterprise, within which other first and second user groups 100A and 100B respectively are present. Second user group 100B may also be connected to the network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as cable modem 105. First and second cellular APs 195A and 195B respectively provide, for example, cellular GSM (Global System for Mobile Communications) telephony services as well as 3G, 4G evolved, and 5G services with enhanced data transport support. Second cellular AP 195B provides coverage in the exemplary embodiment to first and second user groups 100A and 100B. Alternatively the first and second user groups 100A and 100B may be geographically disparate and access the network 100 through multiple APs, not shown for clarity, distributed geographically by the network operator or operators. First cellular AP 195A as show provides coverage to first user group 100A and environment 170, which comprises second user group 100B as well as first user group 100A. Accordingly, the first and second user groups 100A and 100B may according to their particular communications interfaces communicate to the network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, and 5G. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly, portable electronic devices within first user group 100A may form associations either through standards such as IEEE 802.15 and Bluetooth as well in an ad-hoc manner.

Also connected to the network 100 are Social Networks (SOCNBTS) 165, first automotive parts supplier 170A, e.g. O'Reilly Auto Parts; first automotive service enterprise 170B, e.g. Sears™ Auto Center; automotive parts manufacturer 170C, e.g. Bosch™ Automotive; second automotive parts supplier 170D, e.g. NAP ATM Auto Parts; online retailer 175A, e.g. Amazon™; automotive original equipment manufacturer 175B, e.g. Ford™; and second automotive service enterprise 175C, e.g. Fix Auto™, as well as first and second servers 190A and 190B together with others, not shown for clarity. First and second servers 190A and 190B may host according to embodiments of the inventions multiple services associated with a provider of rating systems and rating applications/platforms (PURDE-FRAS.APs); a provider of a SOCNET or Social Media (SOME) exploiting PURDE-FRASAP features; a provider of a SOCNET and/or SOME not exploiting PURDE-FRASAP features; a provider of services to PEDS and/or FEDS; a provider of one or more aspects of wired and/or wireless communications; an Enterprise 160 exploiting PURDE-FRASAP features; license databases; content databases; image databases; content libraries; customer databases; websites; and software applications for download to or access by FEDs and/or PEDs exploiting and/or hosting PURDE-FRASAP features. First and second primary content servers 190A and 190B may also host for example other Internet services such as a search engine, financial services, third party applications and other Internet based services.

Accordingly, a consumer and/or customer (user) may exploit a PED and/or FED within an Enterprise 160, for example, and access one of the first or second primary content servers I90A and I90B respectively to perform an operation such as accessing/downloading an application which provides PURDE-FRASAP features according to embodiments of the invention; execute an application already installed providing PURDE-FRASAP features; execute a web based application providing PURDE-FRASAP features; or access content. Similarly, a CONCUS may undertake such actions or others exploiting embodiments of the invention exploiting a PED or FED within first and second user groups 100A and 100B respectively via one of first and second cellular APs 195A and 195B respectively and first Wi-Fi nodes 110A.

Figure 1B:
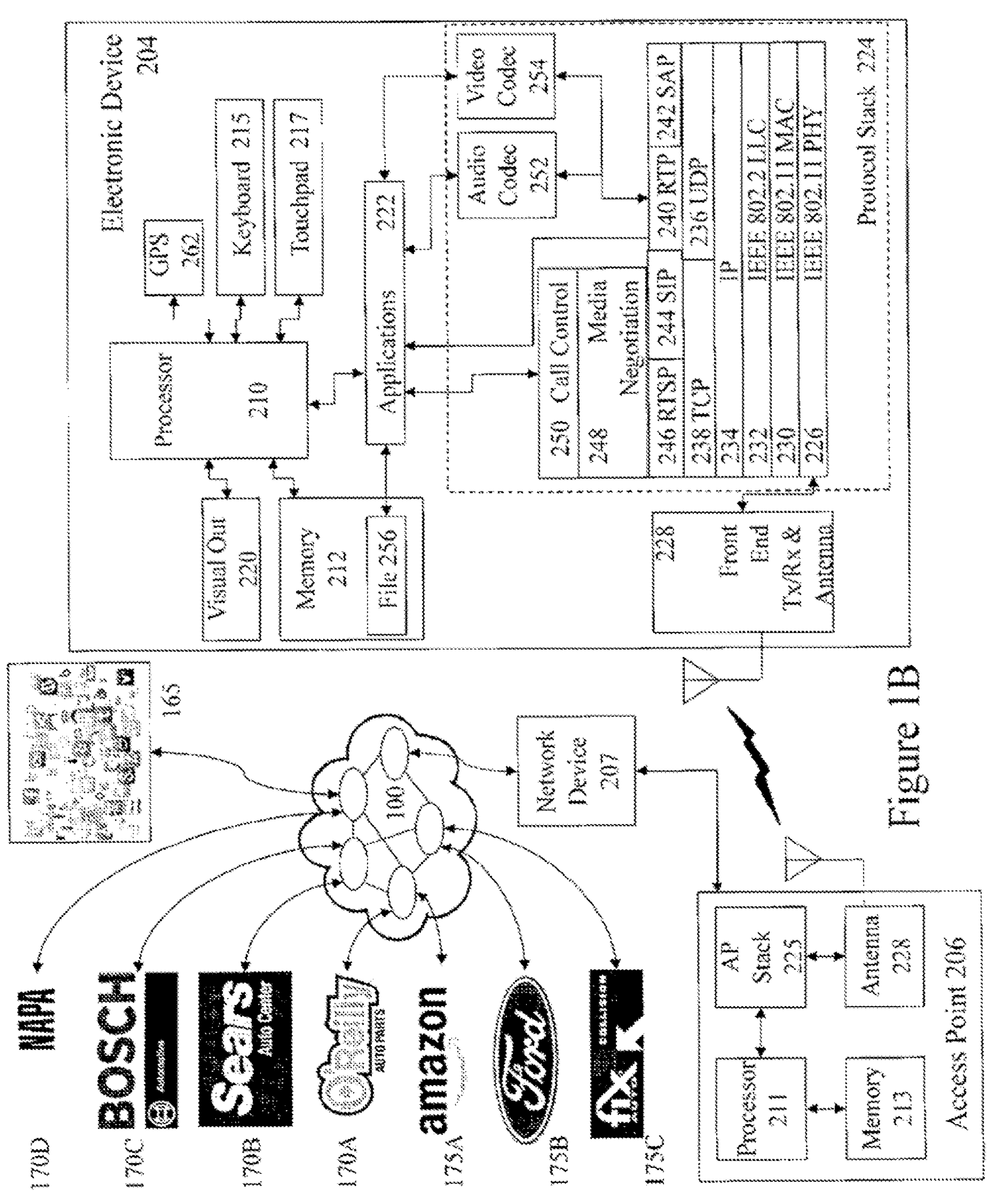
FIG. 1B depicts an example of a typical portable electronic device supporting employment and exploitation of embodiments of the invention as communicating with the network environment presented in FIG. 1A.

Now referring to FIG. 1B there is depicted an electronic device 204 and network access point 206 supporting PURDF-FRASAP features according to embodiments of the invention. Electronic device 204 may, for example, be a PHD and/or FED and may include additional elements above and beyond those described and depicted. Also depicted within the electronic device 204 is the protocol architecture as part of a simplified functional diagram of a system 200 that includes an electronic device 204, such as a smartphone 155, an access point (AP) 206, such as first AP 110, and one or more network devices 207, such as communication servers, streaming media servers, and routers for example such as first and second servers 190A and 190B respectively. Network devices 207 may be coupled to AP 206 via any combination of networks, wired, wireless and/or optical communication links such as discussed above in respect of FIG. 1A as well as directly as indicated. Network devices 207 are coupled to network 100 and therein Social Networks (SOCNETS) 165, first automotive parts supplier 170A, e.g. O'Reilly Auto Parts; first automotive service enterprise 170B, e.g. Sears™ Auto Center; automotive parts manufacturer 170C, e.g. Bosch™ Automotive; second automotive parts supplier 170D, e.g. NAPA™ Auto Parts; online retailer 175A, e.g. Amazon™; automotive original equipment manufacturer 175B, e.g. Ford™; and second automotive service enterprise 175C, e.g. Fix Auto™; as well as first and second servers 190A and 190B together with others, not shown for clarity.

The electronic device 204 includes one or more processors 210 and a memory 212 coupled to processor(s) 210. AP 206 also includes one or more processors 211 and a memory 213 coupled to processor(s) 210. A non-exhaustive list of examples for any of processors 210 and 211 includes a central processing unit (CPU), a digital signal processor (DSP), a reduced instruction set computer (RISC), a complex instruction set computer (CISC) and the like. Furthermore, any of processors 210 and 211 may be part of application specific integrated circuits (ASICs) or may be a part of application specific standard products (ASSPs). A non-exhaustive list of examples for memories 212 and 213 includes any combination of the following semiconductor devices such as registers, latches. ROM, EEPROM, Hash memory devices, non-volatile random access memory devices (NVRAM), SDRAM, DRAM, double data rate (DDR) memory devices, SRAM, universal serial bus (USB) removable memory, and the like.

Electronic device 204 may include an audio input element 214, for example a microphone, and an audio output element 216, for example, a speaker, coupled to any of processors 210. Electronic device 204 may include a video input element 218, for example, a video camera or camera, and a video output element 220, for example an LCD display, coupled to any of processors 210. Electronic device 204 also includes a keyboard 215 and touchpad 217 which may for example be a physical keyboard and touchpad allowing the user to enter content or select functions within one of more applications 222, Alternatively, the keyboard 215 and touchpad 217 may be predetermined regions of a touch sensitive element forming part of the display within the electronic device 204. The one or more applications 222 that are typically stored in memory 212 and are executable by any combination of processors 210. Electronic device 204 also includes accelerometer 260 providing three-dimensional motion input to the process 210 and GPS 262 which provides geographical location information to processor 210.

Electronic device 204 includes a protocol stack 224 and AP 206 includes a communication stack 225. Within system 200 protocol stack 224 is shown as IEEE 802.11 protocol stack but alternatively may exploit other protocol slacks such as an Internet Engineering Task Force (IETF) multimedia protocol stack for example. Likewise. AP stack 225 exploits a protocol stack but is not expanded for clarity. Elements of protocol stack 224 and AP stack 225 may be implemented in any combination of software, firmware and/or hardware. Protocol stack 224 includes an IEEE 802.11-compatible PHY module 226 that is coupled to one or more Front-End Tx/Rx & Antenna 228, an IEEE 802.11-compatible MAC module 230 coupled to an IEEE 802.2-compatible LLC module 232. Protocol stack 224 includes a network layer IP module 234, a transport layer User Datagram Protocol (UDP) module 236 and a transport layer Transmission Control Protocol (TCP) module 238.

Protocol stack 224 also includes a session layer Real Time Transport Protocol (RTP) module 240, a Session Announcement Protocol (SAP) module 242, a Session Initiation Protocol (SIP) module 244 and a Real Time Streaming Protocol (RTSP) module 246. Protocol stack 224 includes a presentation layer media negotiation module 248, a call control module 250, one or more audio codecs 252 and one or more video codecs 254. Applications 222 may be able to create maintain and/or terminate communication sessions with any of devices 207 by way of AP 206. Typically, applications 222 may activate any of the SAP, SIP, RTSP, media negotiation and call control modules for that purpose. Typically, information may propagate from the SAP, SIP, RTSP, media negotiation and call control modules to PHY module 226 through TCP module 238, IP module 234, LLC module 232 and MAC module 230.

It would be apparent to one skilled in the art that elements of the electronic device 204 may also be implemented within the AP 206 including but not limited to one or more elements of the protocol stack 224, including for example an IEEE 802.11-compatible PHY module, an IEEE 802.11-compatible MAC module, and an IEEE 802.2-compatible LLC module 232. The AP 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by electronic device 204 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, LTE, 5G, ITU-R 5.138, ITU-R 5.150. ITU-R 5.280, IMT-1000, DSL, Dial-Up, DOCSIS, Ethernet, G.bn, ISDN, MoCA, PON, and Power line communication (PLC).

Figure 2:
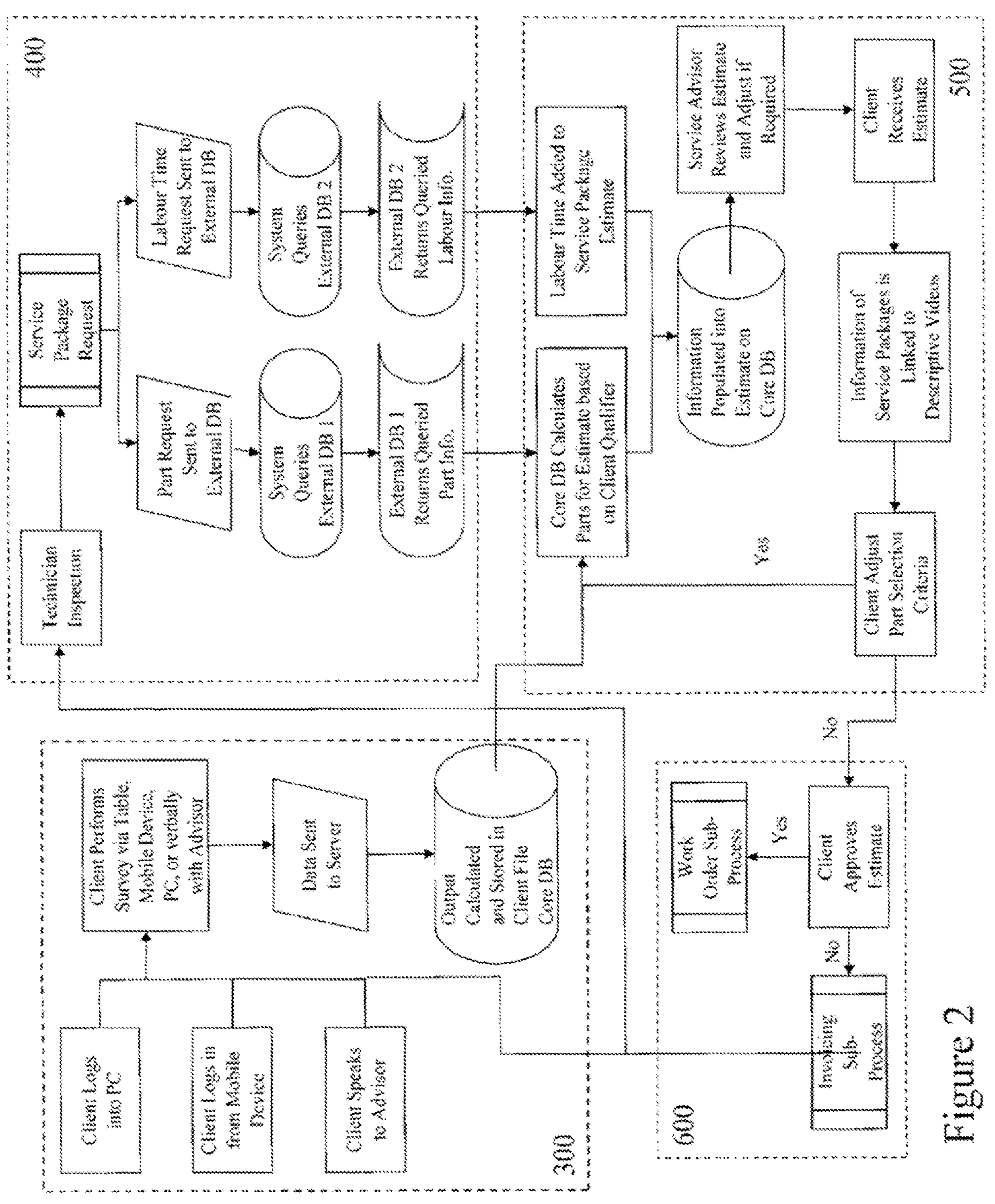
FIG. 2 depicts an exemplary flow chart for a software application.

Now referring to FIG. 2 there is depicted an exemplary flow chart for a software application supporting PURDE-FR ASAPs according to an embodiment of the invention. As depicted the exemplary flow of the software application comprises a series of modules:

First module 500 relating to a client driven search and decision process;

Second module 400 relating to a technician inspection search and decision process;

Third module 500 relating to client decision process; and

Fourth module 600 client driven post-purchasing decision process.

It would be evident to one skilled in the art that other process flows may be implemented according to other embodiments of the invention and that the process flow depicted in FIG. 2 may be partitioned into different modules without departing from the scope of the invention.

Figure 3:
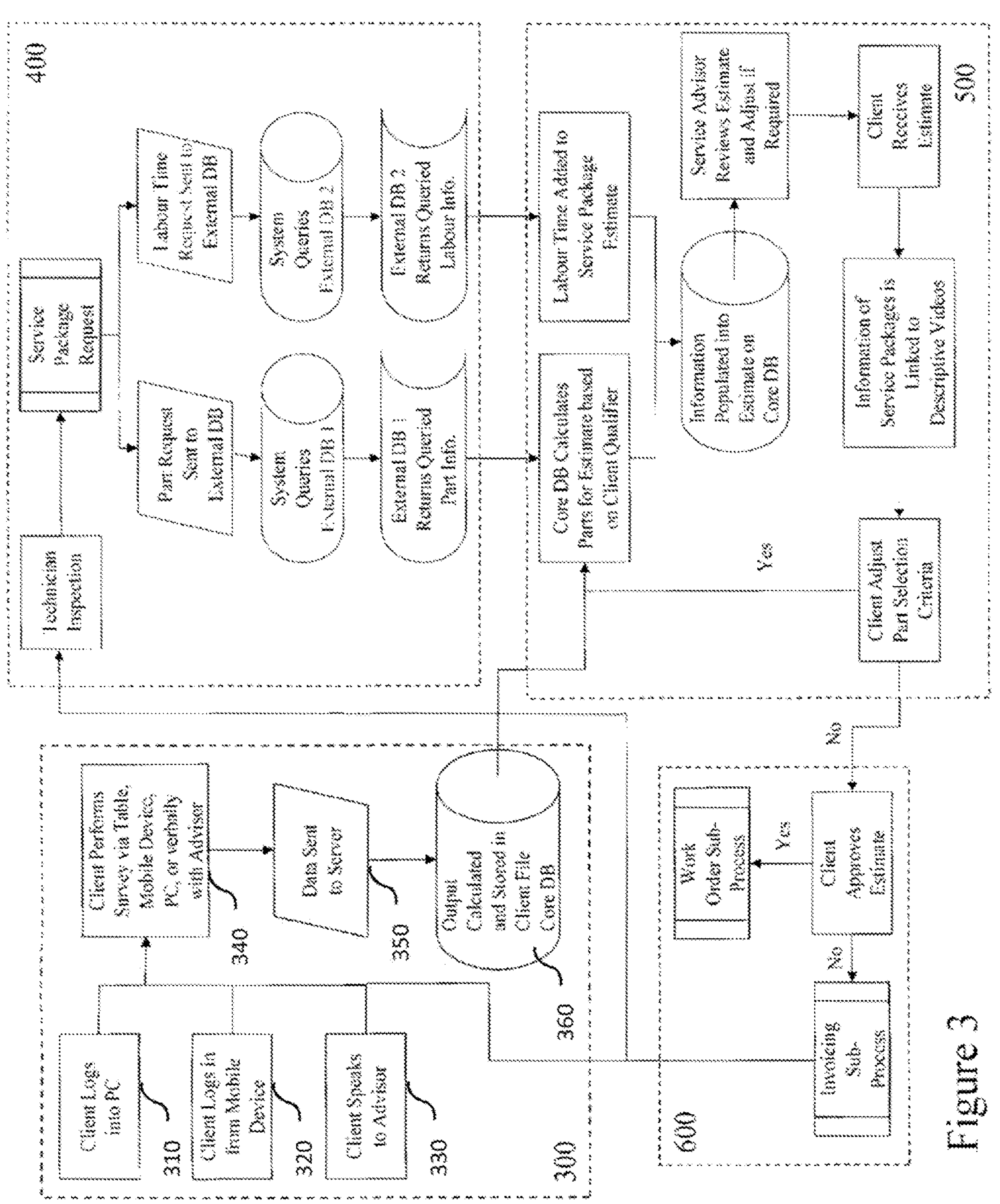
FIG. 3 depicts steps within a client driven search and decision process.

Now referring to FIG. 3 there is depicted first module 300 relating to a client driven search and decision process within a software application supporting PURDE-FR ASAPs according to an embodiment of the invention. Accordingly, there are presented first to sixth steps 310 to 360. Within first to third steps 310 to 330 the user accesses the PURDE-FRASAP by either logging in via their PC, an example of a FED, logging in via their smartphone, an example of a PED, or speaking to an advisor respectively. Speaking to an advisor may be via a PED, conventional telephone, or the user's PED/FED via a Voice-over-Internet Protocol (VOIP) service such as Skype™ or Vonage™ for example. From either of these access steps first module 300 proceeds to step 340 wherein the user undertakes a search and decision process, e.g. searching for automotive parts and/or automotive services via the PURDE-FRASAP according to an embodiment of the invention. Based upon the user's search/decision making process a set of client driven data is generated and sent to a remote server in step 350. Next in step 360 the client driven data is processed to establish an output data set which is stored within a client file within a core database (Core DB) for subsequent retrieval and use. From step 360 in first module 300 the process proceeds to step 510 in third module 500 as described below in respect of FIG. 5.

Figure 4:
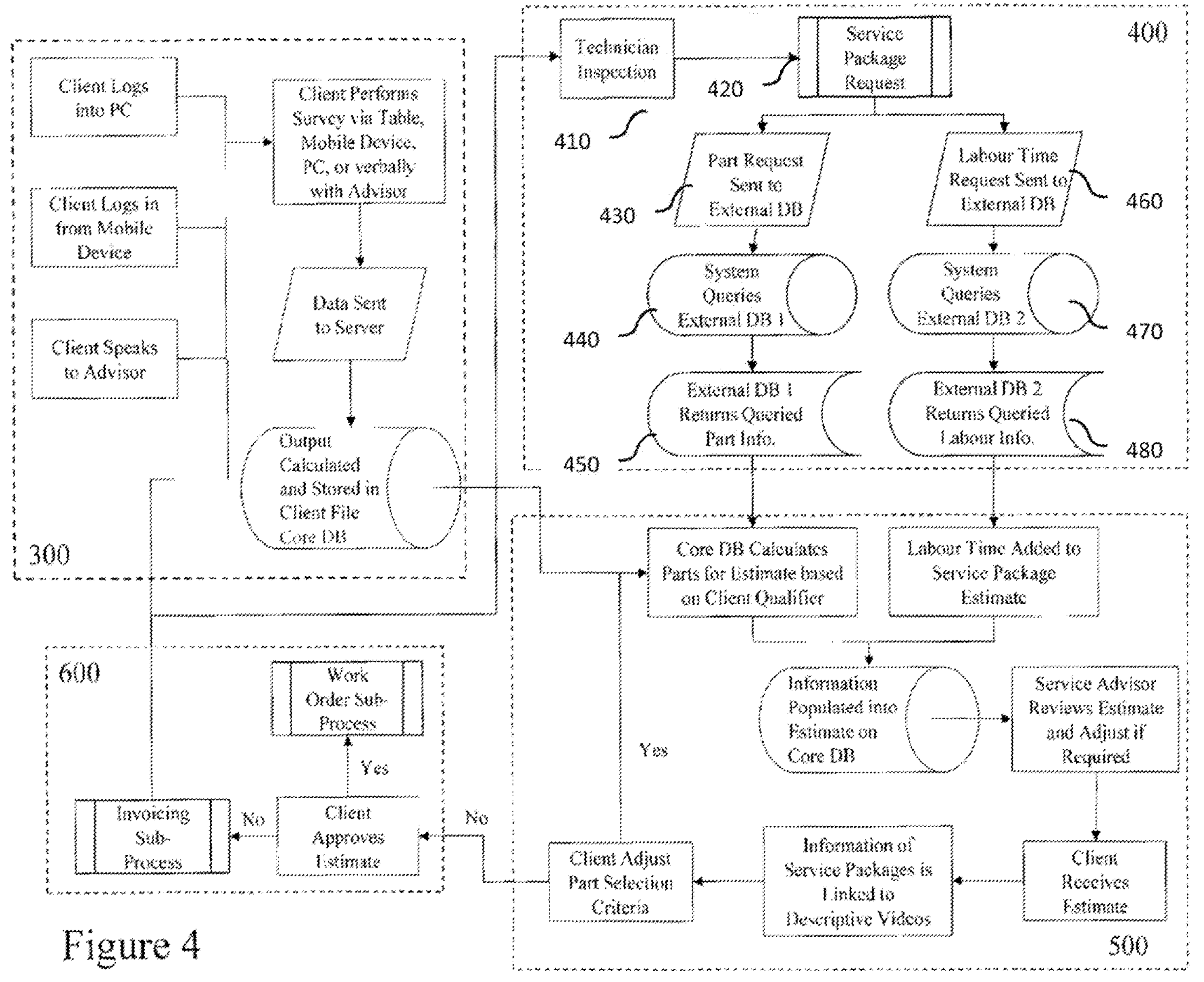
FIG. 4 depicts steps within a technician inspection search and decision process.

In the application of a PURDE-FRASAP according to an embodiment of the invention then the user is presented as making a search and decision process, e.g. searching for automotive parts and/or automotive services via the PURDE-FRASAP. Within such an application the user may also seek to obtain the requisite activity, e.g. service, maintenance, or repair, on their automotive, through a third party service provider such as an automotive dealership, a local mechanic, collision repair service, etc. Accordingly, in this instance the user exploits second module 400 as depicted in FIG. 4 with an exemplary flow within a software application supporting PURDE-FRASAPs according to an embodiment of the invention. It would be evident that in a range of scenarios such as heating, plumbing, automotive, air conditioning, electrical, etc. that the user seeking to make the balanced informed decision does not have the requisite skills and hence exploits the services of a technician in the related field to give them an initial requirement. However, rather than supply accept the technician's prepared requirements for parts and labor the user wishes to make some adjustments based upon their circumstances and their wider viewpoint of the requirements than either the technician has.

As depicted this second module 400 begins with process step 410 wherein a technician inspection is performed. From this step the technician establishes a service package request, e.g. replace the brakes and tires on a vehicle 420. This service package request triggers two parallel threads within the second module 400 depicted by first thread comprising steps 430 to 450 and second thread comprising 460 to 480 respectively. Considering initially the first thread then as depicted:

Step 430—wherein a parts request with respect to the service package is generated and communicated to an external database;

Step 440—wherein the system queries the external database for parts matching the parts request transmitted in step 430; and Step 450—wherein the external database returns part information based upon the parts request and the query.

Similarly, the second thread as depicted relates to labor and comprises:

Step 460—wherein a labor request with respect to the service package is generated and communicated to an external database;

Step 470—wherein the system queries the external database for labor tasks associated with the labor request transmitted in step 460; and Step 480—wherein the external database returns labor information based upon the parts request and the query.

Figure 5:
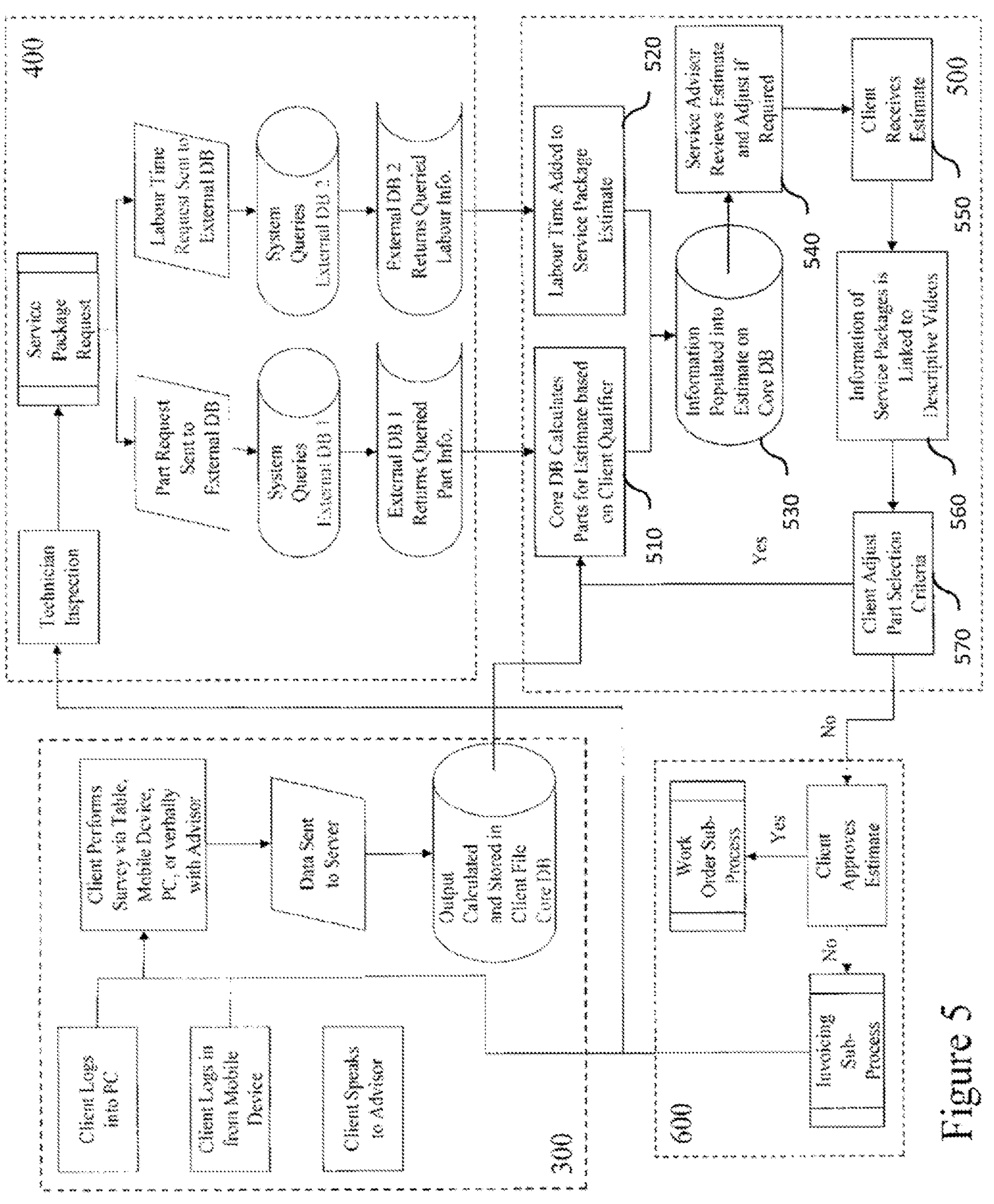
FIG. 5 depicts steps within a client driven search and decision process.

Now referring to FIG. 5 the third module 500 is depicted as comprising first to seventh steps 510 to 570 respectively. Third module 500 is linked to the first module 300 such that after step 360 as depicted in FIG. 3 the process proceeds to step 510. Third module 500 is also linked to the second module 400 such that step 450 as depicted in FIG. 4 links to step 510 and step 480 as depicted in FIG. 4 links to step 520. As depicted therefore third module 500 comprises.

Step 510—wherein the Core Database (Core DB) storing the output in step 360 in first process 300 calculates what parts to use within the estimate based upon the qualifier's selected by the user;

Step 520—wherein the labor elements established in step 480 of second process 400 are added to the estimate:

Step 530—wherein the information from steps 510 and 520 is populated into the estimate on the Core DB;

Step 540—wherein a service advisor reviews the estimate and makes adjustments a necessary, such that for example, whilst the user selected new brake pads and new tires they were not aware of the requirement to also replace brake caliper pins based upon the age of their vehicle or in light of a recall or that the labor estimate for replacing brake pads can be adjusted as the tires are being removed already for replacement;

Step 550—wherein the advisor approved estimate is released to the user;

Step 560—wherein the user receives the estimate based upon either their data entry or that from the technician inspection together with informational audiovisual content that may be appropriate to explain the required work and/or provide the user with an installation guide for example; and Step 570—wherein the user may accept the estimate or may wish to make adjustments wherein based upon these decisions the process either proceeds to fourth module 600 or loops back to step 510 wherein the modified parts are used within the building of a modified quotation to the user.

Figure 6:
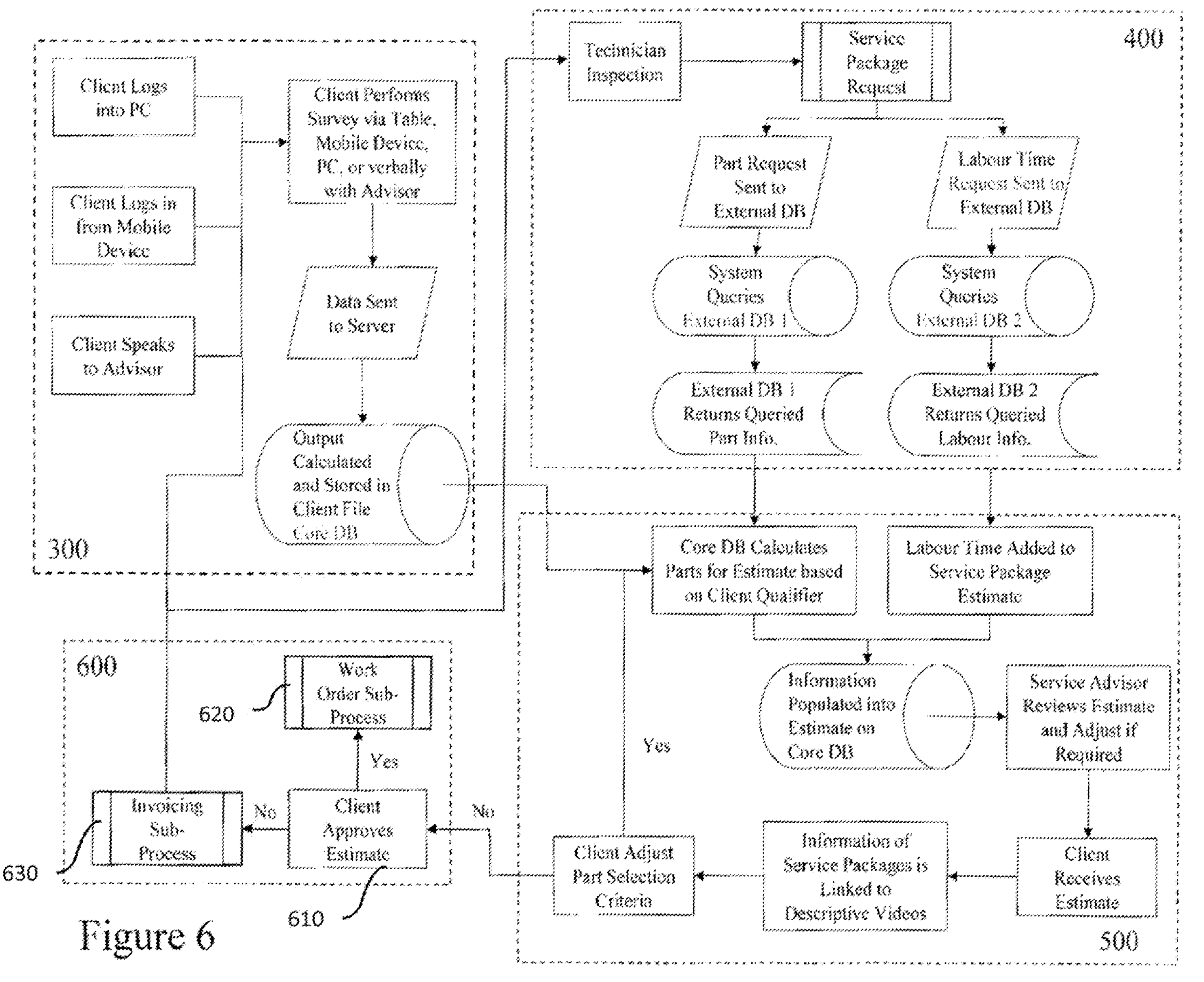
FIG. 6 depicts steps within a client driven post-purchasing decision process.

Now referring to FIG. 6 the fourth module 600 is depicted as comprising first to third steps 610 to 630 respectively. Fourth module 600 is linked to the third module 500 such that after step 570 as depicted in FIG. 5 with a user approval of the initial or revised estimate the process proceeds to step 610. As depicted therefore fourth module 600 comprises:

Step 610—wherein the user formally approves or rejects the estimate;

Step 620—wherein the user has approved the estimate thereby triggering purchase of the parts and/or scheduling of the technician to perform the work; and Step 630—wherein the user rejects the estimate thereby halting all sub-processes wherein the process loops back to either step 330 in first module 300 or step 410 in second module 400 in order to loop back around and seek an alternate fulfillment to the user's requirement.

Figure 7:
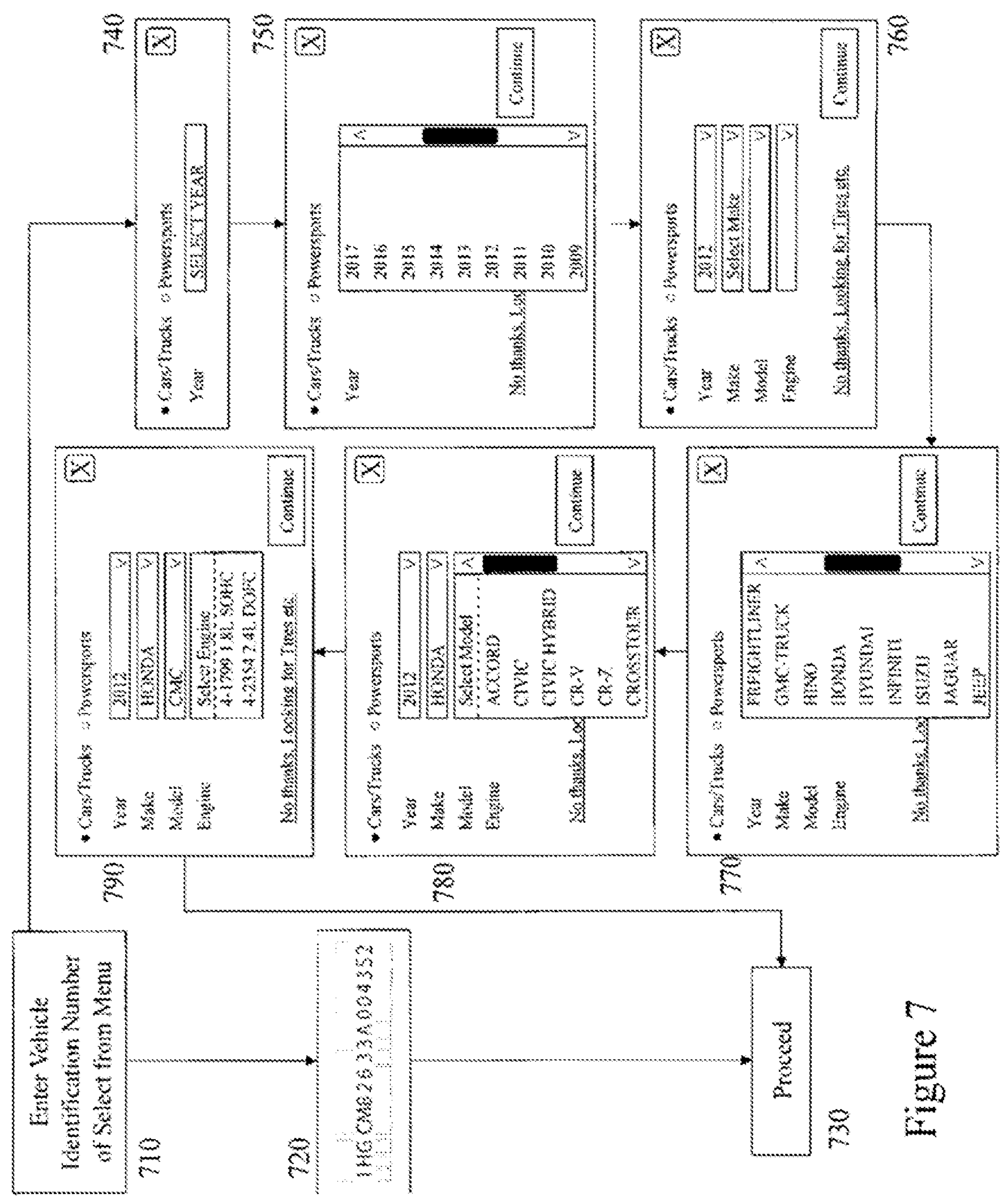
FIG. 7 depicts a context determination process.

FIG. 7 depicts a context determination process for a PURDE-FRA SAP according to an embodiment of the invention as depicted with respect to an automotive requirement. Optionally, a PURDF-FRASAP may be configured and accessed by users for a single category of service/product or alternatively the PURDF-FRASAP may be configured and accessed by users for multiple categories of service and/or product. As depicted the process begins at step 710 wherein the user selects to either enter a vehicle identification number (VIN) or select the vehicle to which the activity relates through a series of menus, depicted as step 740 to 790 respectively. Upon a determination to enter the VIN the process proceeds to step 720 wherein the user enters the VIN which is then parsed to extract the manufacturer identifier, second character, country of origin, first character, and vehicle details, fourth to eighth characters with their associated check digit in the ninth character location. Once, the VIN has been parsed and validated the process proceeds to step 730 otherwise it loops around until a valid VIN is entered or the user exits the PURDF-FRASAP.

With the menu option the user is guided through a sequence comprising:

Step 740—wherein the user selects to establish a car/truck rather than a power sport vehicle such as motorcycle, all-terrain vehicle (TV), quad hike, etc.;

Step 750—wherein the user selects the year of manufacture for their vehicle as popular models are re-designed and re-specified throughout their period of availability;

Step 760—wherein the user selected "2012" that refines or filters subsequent lists;

Step 770—wherein the user selects the manufacturer, Honda™;

Step 780—wherein the user selects the model by that manufacturer, e.g. Civic; and Step 790—wherein the user selects in this instance engine to reflect the different specifications simultaneously offered, in this case a 1.8 liter single overhead camshaft (SOHC) or 2.4-liter double overhead camshaft (DOHC). Alternatively, the user may select grade of vehicle such as LX, EX, etc.

Accordingly, within the embodiment of the invention the process depicted in FIG. 7 establishes a context for the user's activity against which other actions subsequently are defined In an alternate embodiment relating to plumbing the user may select though a similar menu sequence that the plumbing activity is indoor, in the bathroom, and is replacing the shower closet. Accordingly, as depicted in FIG. 8 the user can now perform a contextually driven decision making process within a PURDE-FRASAP according to an embodiment of the invention. As such FIG. 8 depicts a process comprising;

Step 810—wherein the user selects a category of activity, e.g. they select "Brakes" from the displayed list of activities that are contextually defined by their selection of the "2012 Honda Civic";

Step 820—wherein the user selects a sub-category of activity, e.g. they select "Front Brake Hardware" from the displayed list of activities that are contextually defined by their selection of the "2012 Honda Civic" and category of "Brakes".

Step 830—wherein the user is presented with options in respect of the parts relating to their category and sub-category within the overall context;

Step 840—wherein the user has selected a "front guide pin" within the options presented in step 830 and elected to view the detailed information which in this instance is an image of the product but may include, images, dimensions, audiovisual segments, electronic documents etc.; and Step 850—wherein the user has selected brake caliper guide pin kit and ceramic brake pads.

From step 830 if the user does rot find what they wanted then they loop back to step 820. Similarly, from building their parts list in step 850 they can loop back to step 810 or 820. In this manner the user can establish a parts list associated with multiple activities either related or unrelated.

Figure 9:
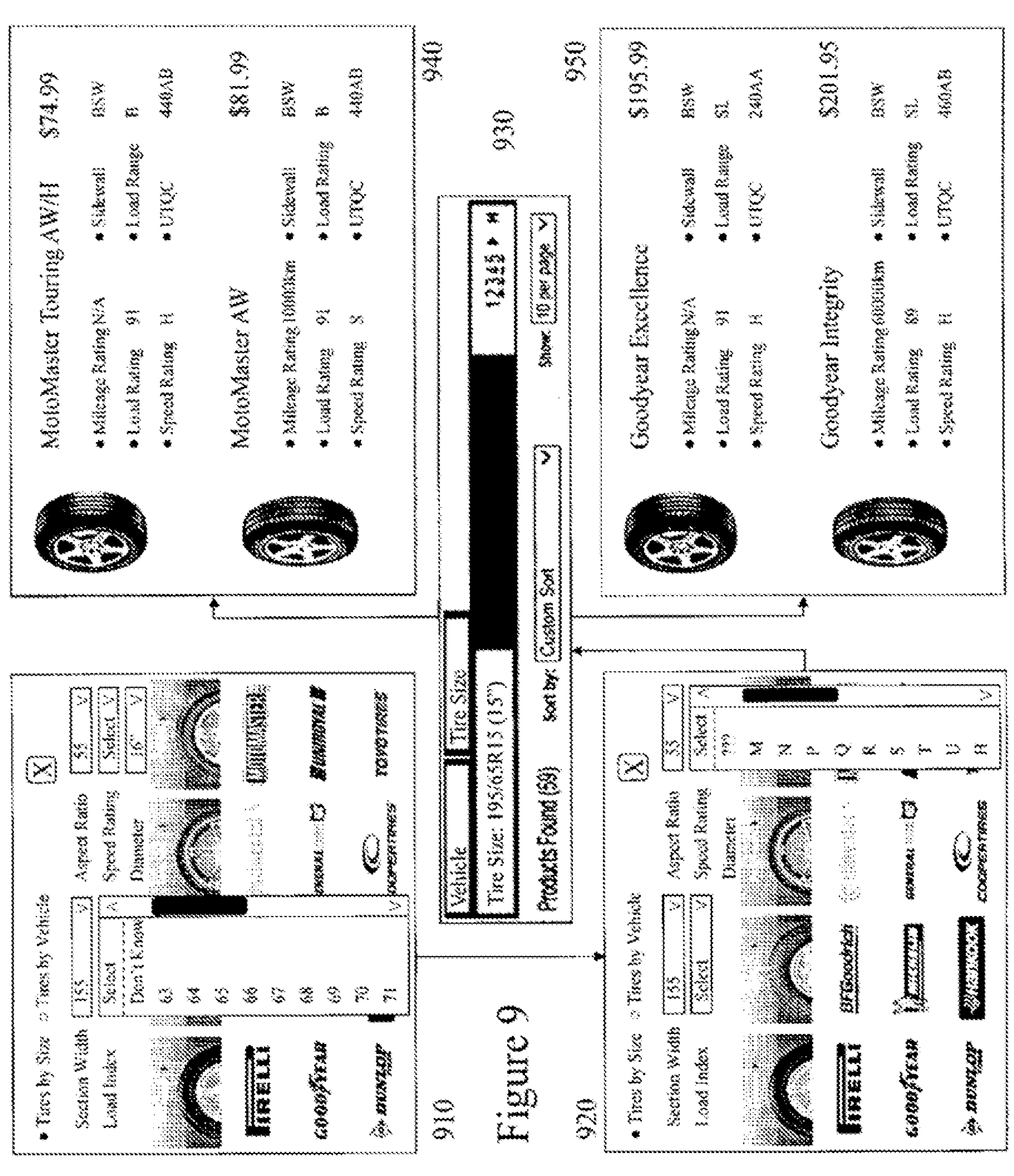
FIG. 9 depicts a contextually driven decision making process.

Now referring to FIG. 9 there is depicted a contextually driven decision making process within a PURDE-FRASAP according to an embodiment of the invention, but now relating to tires. Accordingly, the process comprises;

Step 910—wherein the user has reached part way through an extended process, the earlier steps of which have been omitted for clarity but the user selected a tire width of 155, an aspect ratio of 55 and hub diameter 16". Now within step 910 they are being asked to select the load index of the tire where this defines the tires weight carrying ability, which as depicted is a numeric scale between 63 and 90 but the list can be scrolled to higher values. A load index of 90 corresponds to 600 kg (approx. 1325 pounds) for that tire;

Step 920—wherein the user is now asked to select a speed rating of the tire, wherein these are depicted as characters according to a standard;

Step 930—wherein having selected "Don't Know" in each of steps 910 and 920 they are presented with 59 products within the already restricted category of 195/65 15" tires;

Step 940—wherein the user is presented with lowest cost tire options such as the MotoMaster Touring AW/H for $74.99 which has a load index of 91, a speed rating of H, and a non-specified mileage rating; and Step 950—wherein the user is presented with highest cost tire options such as the Goodyear™ Integrity for $201.99 which has a load index of 89 (lower than the MotoMaster Touring AW/H), a speed rating of H, and an 80,000 km (approx. 50,000 miles).

Figure 10:
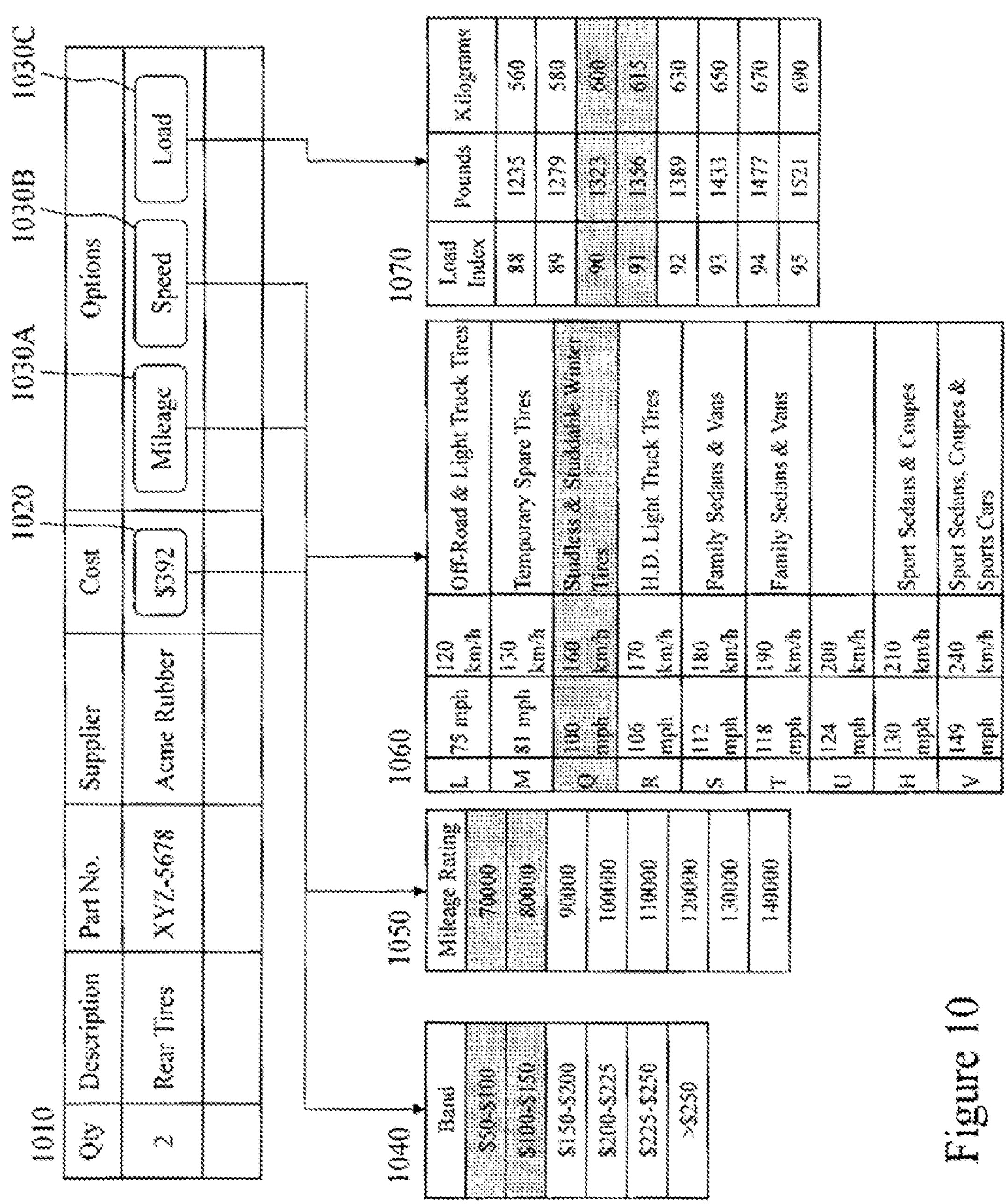
FIG. 10 depicts a contextually driven balanced purchasing decision variation methodology.

Accordingly, consider the instance that the tires were part of an overall estimate relating to a vehicle where the user was replacing tires and brakes but having selected the various parts is not seeking to understand how they may adjust the overall parts list to, for example, lower cost without reducing overall performance. In another instance, for example, the user may be changing away from winter tires and requires new tires but in 6 months is ending the lease and anticipates only 4,000-5,000 km of use (approx. 2,500-3,100 miles). Further, by virtue of their vehicle only be a 4-door sedan (Honda Civic) their loading is light unlike perhaps if it was a sports utility vehicle (SUV) and their typical travel within a city. Accordingly, referring to FIG. 10 there is depicted a contextually driven balanced purchasing decision variation methodology within a PURDE-FRASAP according to an embodiment cf the invention.

As depicted table 1010 represents part of a parts list presented to a user identifying 2 Rear Tires as part of the list supplied by Acme Rubber with part number XYZ-5678 at a cost of $392, i.e. $196 (or $195.99 normally) each. Also presented to the user arc First button 1020 and second to fourth buttons 1030A to 1030C respectively. Selection of each triggers a pop-up menu for selecting an adjustment in the specification of the tire. Accordingly:

First button 1020 allows the cost range to be established by selecting one or more elements in second table 1040, such that for example the user wants to see options within the price range $50-$150;

Second button 1030A allowing the user to select mileage ratings of 70,000 and 80,000 either in isolation of an action through first button 1020 or in combination with it;

Third button 1030B allowing the user to select a speed rating of Q which relates to a maximum speed of 160 km/h (100 mph) either in isolation or in combination with others; and Fourth button 1030C allowing the user to select a load rating of 90/91 equivalent to 600/615 kg per tire (1323-1356 pounds).

As the user has previously established the context, e.g. 2012 Honda Civic, then fourth button 1030C may be restricted to depict only those options exceeding the rated weight per wheel from the manufacturers guide. Optionally, the filtering process applied may take each of the options in respect of second to fourth buttons 1030A to 1030C as a minimum requirement such that, for example, if a 120,000 km mileage rated tire was available at $99.99 it would be depicted as an alternative. Similarly, with respect to other options if selected.

The mileage rating in the instance of tires is a measure of lifetime of the product which may be a factor in many aspects of decisions made by users. Alternatively, a warranty may be an issue such that, for example, a user may wish to see the impact of trading hot water boiler warranty on the cost of renovating the hot water within their residence and as such can dynamically make an adjustment and see the potential impact to the overall bill of parts.

In other embodiments of the invention the selection of an alternate part within a list of parts may trigger adjustments in others in order that the total parts list fulfills the desired task for the user. For example, if they have selected a hot water system with boiler, tap, copper pipe and copper fittings and modify the pipe to PVC then all of the fittings require adjustment if they accept that the maximum water temperature can now be only 55° C. (130° F.). However, this may also change the time required to assemble for a plumber as perhaps solder fittings are replaced with glued fittings or compression fittings and these take less time/more time respectively.

Figure 11A:
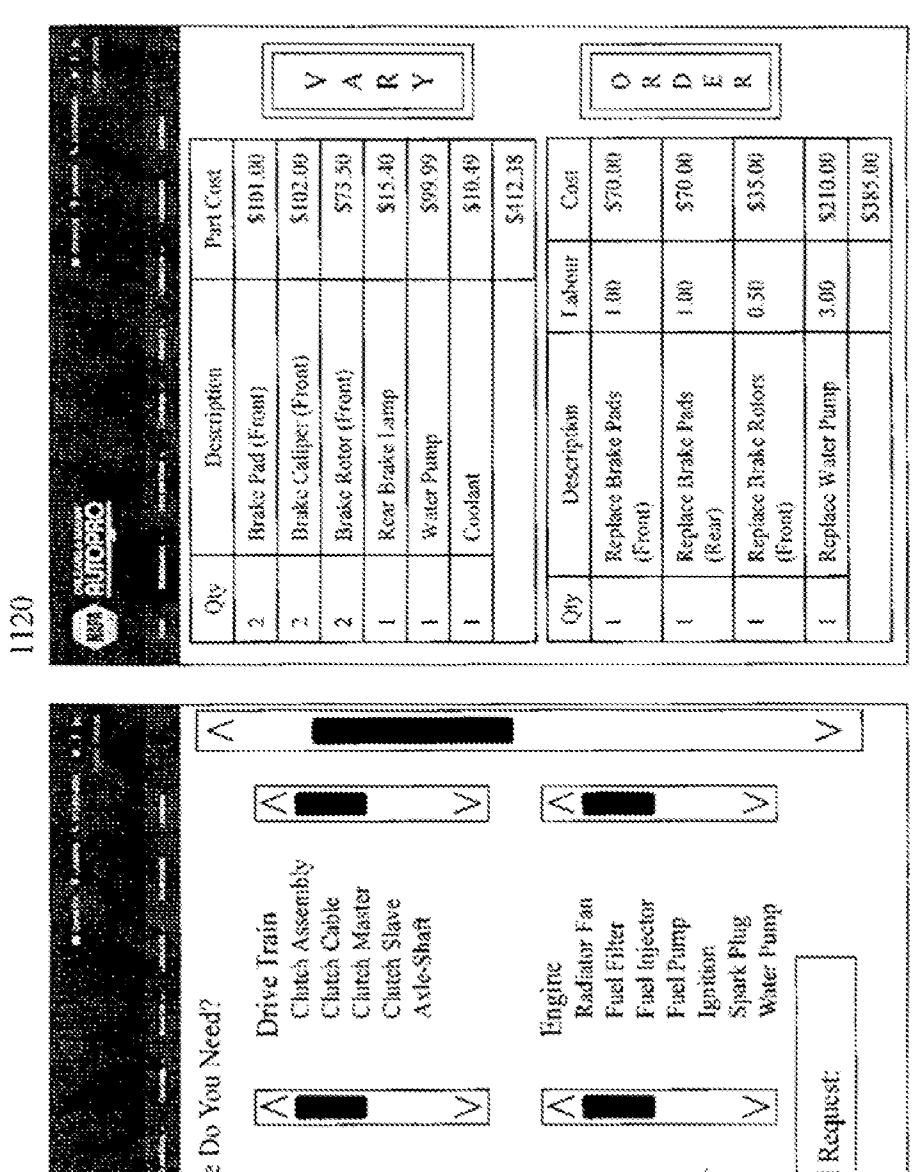
FIGS. 11A and 11B depict a balanced purchasing decision variation.
Figure 11B:
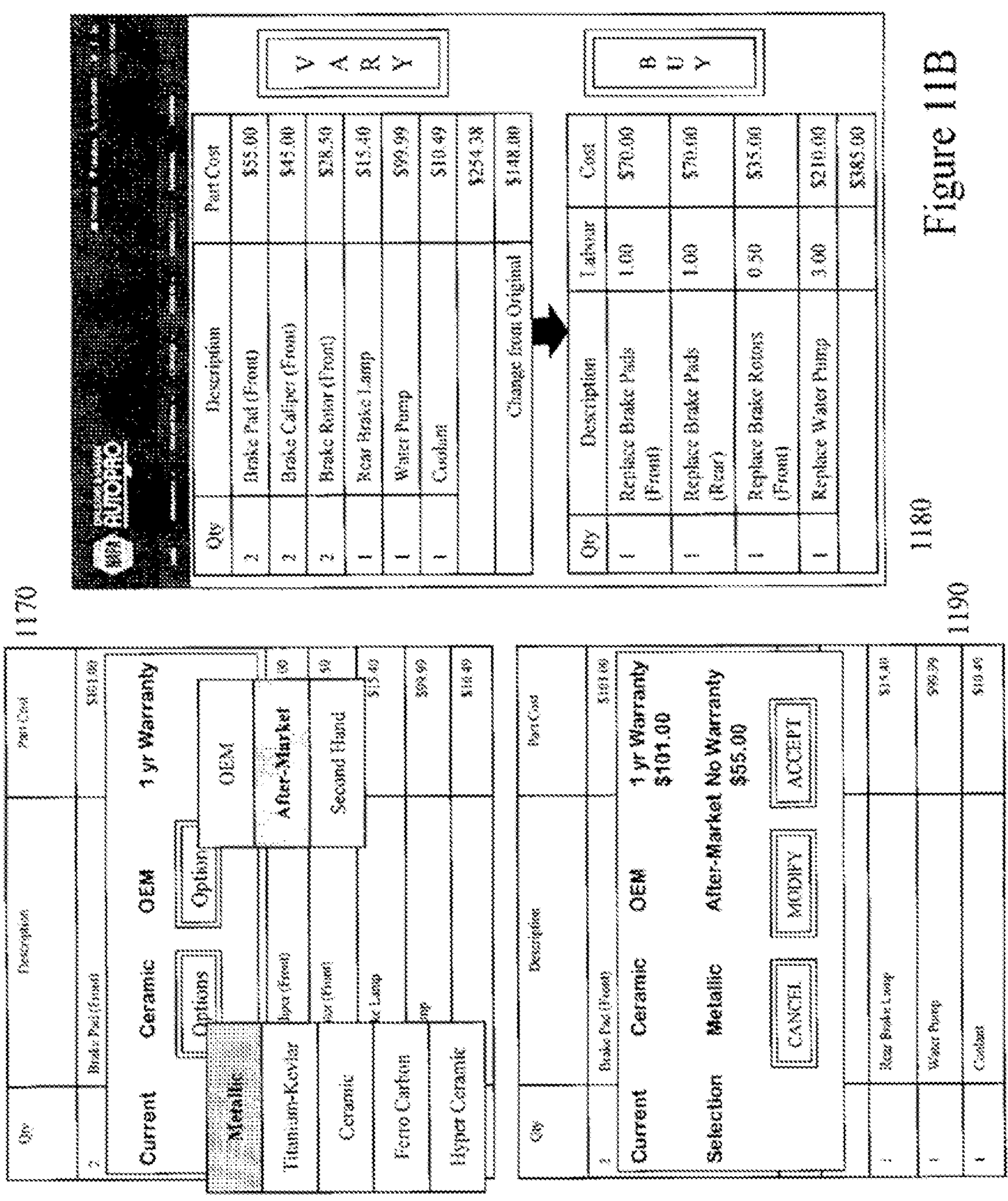

Now referring to FIGS. 11A and 11B there are depicted images relating to a balanced purchasing decision variation methodology within a PURDE-FRASAP according to an embodiment of the invention. As depicted in FIG. 11A a user accesses a first webpage 1110 relating to a provider of maintenance and repair services relating to motor vehicles wherein they are provided with a standard list of services relating to their vehicle together with a field for entering a special request. Based upon selection of an item, e.g. Brake Pad(s) Replacement and a subsequent selection of "Front" (not shown for clarity) and know ledge of the vehicle of the user, for example through a selection process such as described supra or through their logging into the web service thereby retrieving data associated with their account. Such a login process may for example be via a social media account of the user as known in the art or through alternate methods such as username/password etc. Accordingly, the system retrieves a list of parts based upon a standard service menu and a schedule of associated labor with the requested service which are displayed in second webpage 1120. In this instance the "Brake Pad(s) Replacement" has triggered a list of front brake pads, front brake calipers, and front brake rotors. Equally, a special request of new water pump has triggered the listing of a water pump and coolant.

The provider of maintenance and repair services may have a small number of standard parts suppliers whose data is retrieved in order to populate the parts list 1130 with pricing information and their own maintenance task list used to populate the labor list 1140. The user is also presented with "Vary" 1150 and "Order" 1160 buttons with respect to the displayed part and labor information. If they select "Order" 1160 then they are processed through a scheduling process wherein factors including, but not limited to, part availability, user availability, technician availability, etc. are employed to provide the user with a scheduled appointment to have their vehicle worked upon. In the instance that the user selects "Vary" 1150 then they are presented with a variant of second webpage 1120 wherein the user can select a part listed, e.g. Brake Pad(Front), leading to a modified display window such as that depicted in first image 1170 in FIG. 11B wherein additional information is presented relating to the current part, e.g. "Ceramic OEM 1 yr. Warranty" together with available options in respect of modifying the part. In this instance the user may select the type of brake pad, e.g. metallic, titanium-Kevlar™, ceramic, ferro carbon, and hyper ceramic. They are also offered in this instance different, categories such as OEM, After Market, and Second Hand. Accordingly, if the user as indicated selects Metallic and After Market then the display changes to second image 1190 based upon the system searching for alternate parts that meet these criteria and now the user can see that such a part alternative is $55 versus the original $101 but offers no warranty.

Accordingly, through this process the user may make informed decisions as to the balance between cost, performance, warranty etc. in respect of their parts. In instances that the alternate part is incompatible with other elements of the original parts list then this fact may be either highlighted giving the user the ability to accept additional changes oi be performed automatically. In second image 1190 the user may cancel, modify or accept the change. If they accept then the third image 1180 is provided to user showing the modified part list and labor listing. Just as other parts may adjust through the selection of a modification of a part within the bill of materials then some may trigger an adjustment in the labor portion. In this instance the selected alternate parts lower the pan cost by $148.

It would be evident that the simplified part list presented in FIGS. 11A and 11B may be presented in other aspects of the invention or alternatively a more detailed parts list may be provided as discussed and depicted in respect of other aspects of the invention in FIGS. 1 to 10 within an embodiment of the invention as presented with respect to FIGS. 11A to 11B.

It would be evident to one of skill in the art that the process described and depicted in respect of FIGS. 11A and 11B may provide a manufacturer of parts with lost sales data. Accordingly, the data acquired by embodiments of the invention may allow a manufacturer to establish purchasing i maintenance patterns for parts, sub-assemblies, etc. by part, vehicle make, vehicle type, year of manufacture etc. Equally, a service chain may establish a common trend with respect to its customers and may make an adjustment in the standard parts associated with specific menu driven maintenance and/or repair activities. In other embodiments of the invention the lack of a specific part within the parts supplied by a manufacturer associated with the maintenance/repair facility may be identified as an issue arising with a particular make, model, year etc. becomes evident thereby allowing the manufacturer to establish a part earlier than perhaps would have been the case.

Figure 12:
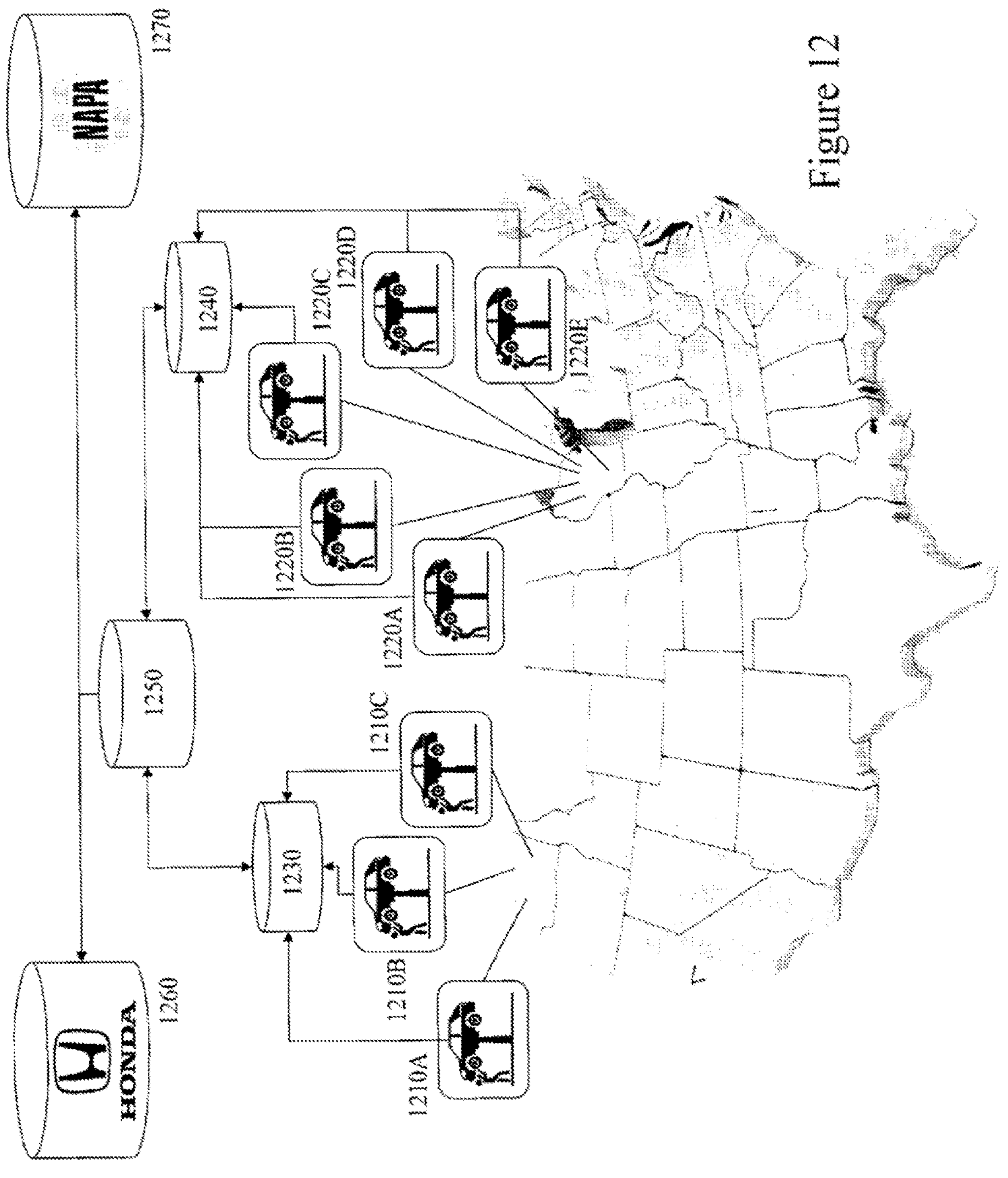
FIG. 12 depicts schematically knowledge base creation through aggregation of data.

Referring to FIG. 12 there is depicted schematically the creation of a knowledge base through aggregation of data obtained/derived through purchasing decision framework systems, applications and platforms (PURDE-FRASAPs) according to an embodiment of the invention. Accordingly, as depicted a first set of service locations 1210A to 1210C in Washington state in the United States exploit PURDE-FRASAPs which communicate with a first local server 1230 and (herein to a remote server 1250. Similarly, a second set of service locations 1220A to 1220E in Wisconsin state communicate with a second local server 1240 and therein to the remote server 1250. Also coupled to the remote server 1250 are manufacturer server 1260, e.g. Honda, and parts supplier server 1270, e.g. NAPA. Accordingly, as users, both vehicle owners and service centers, access and employ the PURDE-FRASAP according to an embodiment of the invention then data is aggregated from a larger number of users rather than that experienced by a single service location, for example. Accordingly, within the database associated with the PURDE-FRASAP a service center in Green Bay, Wisconsin, (e.g. a service location within the second set of service locations 1220A to 1220E) may search for "2008 Honda Civic" and establish that there are records for 100 vehicles within 10 different service locations within a predefined boundary, e.g. "920" area code.

A user may then query "Ball Joint" within an analytics suite associated with the PURDE-FRASAP database(s) or accessing them through third-party software tools. Accordingly, this query yields the summary data within Table 1.

TABLE 1

Example Data for 2008 Honda Civic Ball Joint Replacements within Area Code 920.

| Mileage Band | Qty | 1st Ball Joint Replacement | | Comments |
|---|---|---|---|---|
| 80,000 | 3 | | | |
| 90,000 | 10 | | | |
| 100,000 | 10 | 10 | | |
| 110,000 | | | | |
| 120,000 | 4 | 4 | @100,000 | |
| . . . | | | | |
| 210,000 | 3 | 3 | @100,000 | 1 replace again @170,000<br>1 replaced again @ 195,000 |

Accordingly, based upon this data analysis the PURDE-FRASAP allows the service location user to predict/analyze trends of repairs and create a knowledge base of common repairs for specific concerns. Furthermore, the PURDE-FRASAP can create a forecasting model for suppliers and measure the efficacy of quality on durability of parts. For example, it is evident from Table 1 that one "2008 Honda Civic" reached 210,000 km with a single ball joint replacement. Analysis of that vehicle record indicates that the replacement was a specific brand, e.g. Brand X. Accordingly, the repair options presented to a user can be modified to reflect such data analytics such that a subsequent vehicle owner may be advised that whilst "Brand Y" costs $Y they will need replacing by 200,000 km whereas "Brand X" costing $X would not need replacing by 200,000 km together with labor costs of $Z thereby actually offering the vehicle owner a lower cost of ownership. Additionally, the choice of brand and quality can create trends and analytic measures valuable to manufacturers and to suppliers as well as indicating regional/seasonal variations that may be less evident otherwise.

In many instances, such as that presented supra in respect of Honda Civic servicing the manufacturer may have a standardized service package framework meaning that a left front lower ball joint cannot be a right side lower ball joint. However, non-Honda service locations may have a service heading such as "Replace lower ball joint(s)" which implies both front and/or rear. As all shop label their service packages differently, this makes it virtually impossible to accurately develop analytics. However, as even non-manufacturer based service locations exploiting PURDE-FRASAP access and exploit standardized service packages these differences and disparities can be reduced or eliminated thereby allowing PURDE-FRASAPs the ability to create service excellence standards for the industry so as to protect customers of duplicated servicing.

It would be evident that such dna analytics and analysis can become not only valuable data for service locations, parts manufacturers and vehicle manufacturers but also online retail services such as autoTRADER™ where the analytics of vehicle type with mileage, region etc. may provide users with a projected 1 year/2-year service cost based upon the user's projected annual mileage. Such projections may be automatically provided based upon additional analytics such as average mileage of users within buyer demographics or they may be provided based upon user selections/decisions. Accordingly, the user may by varying, for example, age of the vehicles searched and their mileage establish a cost of ownership that is acceptable to them with respect to anticipated service costs etc. derived from analysis of the PURDK-FRA SAP database(s).

Within embodiments of the invention the system may schedule a technician to perform a particular maintenance/repair task with a fixed cost labor element to the customer. Subsequently based upon the fact that the technician enters start/finish times for the maintenance/repair task via a terminal then the system may establish an efficiency rating for technicians against the different maintenance/repair tasks. Subsequently, when that maintenance/repair task is scheduled the system will seek to assign a technician with a high efficiency, e.g. a low percentage calculated as average t me to complete divided by assigned time, rather than one with a low efficiency. As such the system may adjust options to the user for the schedule or advise the staff at the maintenance/repair facility that the specified technician is scheduled to this task.

It would also be evident that embodiments of the invention may establish a profile relating to the user (customer) based upon their activities and purchasing. Accordingly, a maintenance/repair facility may offer benefits to its customers who regularly maintain, up-specify etc. Such benefits may include loan car, shuttle, preferential maintenance scheduling, early drop-off for maintenance/repair activities etc. In contrast, a customer who regularly does not perform all of the suggested maintenance i repair tasks or reduces the quality of parts may not be as attractive a client and hence not be offered such benefits or may receive additional contacts advising them that they are invalidating warranty on their vehicle, incurring increased running costs etc.

It is also contemplated and understood that information relating to components to be acquired, repaired or replaced may be entered using a method or methods not described above. It should be realized that there are many other acceptable methods of entering such information into the system of the present invention that would be familiar to one skilled in the art and may be employed herein. By whatever method used, each component of the equipment that must be acquired, repaired or replaced is entered into the system.

In association with obtaining information regarding a component to be replaced, the system may optionally identify the entered component in various ways. For example, once the user has entered, selected, or otherwise confirmed a component to be replaced, the system may display a description of the component. The component description may include various information, such as, for example, the location of the component, the function of the component, and other components that interact with and/or may also have to be repaired or replaced. In conjunction with the component description, or alternatively thereto, the system may display an image of the component, such as a photograph or a drawing thereof. The image may be the actual component, or be representative of the component. Any such description or image of a component may be presented on the same web page where the component information is entered. In such a case, the information and/or image may be presented in a separate and controllable window, as an overlay, or by any of various other known techniques. Prior to proceeding to the next step of the repair estimate preparation process, the system may also display a list of all components to be repaired or replaced that have been entered by the user.

Subsequent to, or in conjunction with, receiving the identity of a component to be replaced, the system of the present invention retrieves data relating thereto that will be necessary for preparing the estimate. This data may include the cost of the component to be replaced, as well as the cost of any ancillary items (e.g., fasteners, gaskets, etc.) required thereby and not included with the component. The component cost(s) may be based on the OEM's recommended cost, or on virtually any other base cost deemed appropriate for use in calculating the estimate. Other data that may be retrieved will typically include a standard labor time for replacing the component, which is also typically established by the manufacturer of the equipment. The retrieved data will also typically include a labor rate for replacing the component(s). The labor rate may a national average labor rate, or a labor rate that is more accurately representative of repair facilities in the user's area. Both the component costs and labor times and/or rates may also be based on paid insurance claim data, as opposed to suggested component costs and labor times set forth by the equipment manufacturer or some other source. Each of the component cost, labor time, and labor rate, may come from a single database, or from multiple databases. These databases may be owned by the owner of the system of the present invention. Alternatively, the databases may be owned by a separate entity and accessed by the system of the present invention.

As one exemplary option of the present invention, the system may ask the user whether the user is interested in effecting the repair using an aftermarket component. If the user answers in the negative, the estimate will be based upon original equipment manufacturer parts. If the user answers in the affirmative, however, the generated repair estimate may show a repair cost using an aftermarket, as well as or as opposed to, an OEM component. The estimate reflecting the use of the aftermarket component may appear on the same page as an estimate using an OEM component, or may appear on its own page. The estimate may also illustrate the cost savings realized if an aftermarket component is selected. When only certain components of a repair involving multiple components to be replaced are available in aftermarket form, the system may incorporate the cost of those aftermarket components into the estimate. Depending on the design of the system and the selections made by the user, the remainder of the components to be replaced can then be entered into the estimate using the cost of OEM components, remanufactured components, or used components. In such a case, the system may indicate those components that can, or cannot, be purchased in aftermarket form.

When an estimate using an aftermarket component is prepared, the system retrieves data relating to the component from an appropriate source. For example, the source may be a database(s) of aftermarket components that are available from one or more manufacturers, wholesalers, or retailers. The database(s) may be resident on the central data server, or on a data server(s) associated with a manufacturer or seller of aftermarket components. The system may also connect to another website in order to access information regarding an aftermarket component, retrieve information through the website, and provide it to the appropriate software application(s) of the system. For example, the system may obtain the requisite information directly from the website of an aftermarket component manufacturer or seller.

With respect to the use of aftermarket components, it is contemplated that the information relating thereto may be retrieved from a database(s) owned or controlled by one or more equipment component wholesalers or retailers. The system may then select for use in the estimate the lowest cost found for the particular aftermarket component in question, may select the cost of the most conveniently available component, or may use some other criteria to determine which cost to select for use in the estimate. The system may further indicate the source of the aftermarket component(s) used in preparing the estimate. It may also be possible to allow the user to electronically purchase the aftermarket component(s), should the user so wish after being presented with the estimate(s).

As another exemplary option of the present invention, the system may ask the user whether the user is interested in effecting the repair using a remanufactured component. If the user answers in the negative, the estimate will be unaffected. If the user answers in the affirmative, however, the generated repair estimate may show a repair cost using a remanufactured, as well as or as opposed to, an OEM component. The estimate reflecting the use of the remanufactured component may appear on the same page as an estimate using an OEM component, or may appear on its own page. When an estimate using a remanufactured component is prepared, the system retrieves data relating to the component from an appropriate source. For example, the source may be a database(s) of remanufactured components that are available from one or more manufacturers, wholesalers, or retailers of such components. The database(s) may be the same or different than the database(s) accessed to obtain information on an aftermarket component(s). The database may be resident on the central data server, or on a data server associated with a seller or manufacturer of a remanufactured component. The system may also connect to another website in order to access information regarding a remanufactured component, retrieve information through the website, and provide it to the appropriate software application(s) of the system. The system may select for use in the estimate the lowest cost found for the particular remanufactured component in question, may select the cost of the most conveniently available component, or may use some other criteria to determine which cost to select for use in the estimate. The system may further indicate the source of the remanufactured component(s) used in preparing the estimate. It may also be possible to allow the user to electronically purchase the remanufactured component(s), should the user so wish after being presented with the estimate(s).

As yet another exemplary option of the present invention, the system may ask the user whether the user is interested in effecting the repair utilizing a used component. If the user answers in the negative, the repair estimate will be unaffected. If the user answers in the affirmative, however, the generated repair estimate may show a repair cost utilizing a used, as well as or as opposed to, an OEM component. In this case, the system may have access to one or more databases of used components. For example, the system may communicate with database(s) containing the inventory of one or more reclaim facilities, re-manufacturing enterprise, second hand retailers, online sales websites, online auction sites etc. In this embodiment, the system may be able to check inventory for availability of a particular component, retrieve cost information, and even reserve a component for purchase. The system may communicate with the used component vendor's database(s) directly. Alternatively, the system may simply link to an existing website associated with the used component vendor's database, through which inventory and price may be checked, and/or components can be purchased.

At some point during the gathering of information, the system may ask the user whether the user is interested in effecting the repair utilizing other than OEM components which will generally be the default component type used by the system and method of the present invention. If the user answers in the negative, the repair estimate will be unaffected. If the user answers in the affirmative, however, the generated repair estimate may also show a repair cost using an aftermarket (i.e., new but non-OEM) component, a remanufactured component, and/or a used component. The estimate reflecting the use of the non-OEM component(s) may appear on the same page as an estimate using only OEM components, or may appear on a separate page(s).

Figure 13:
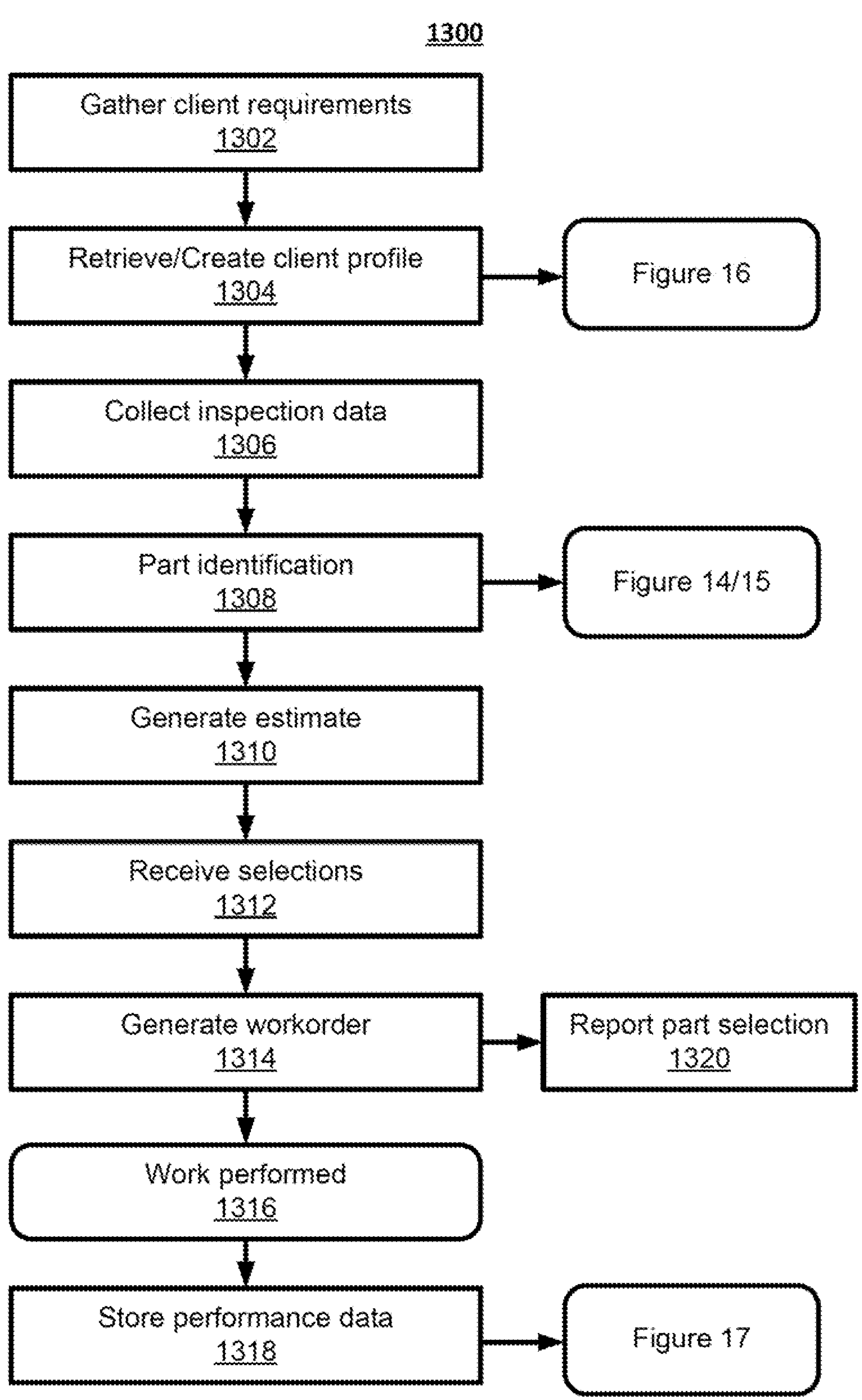
FIG. 13 depicts a method of work order generation.

FIG. 13 depicts a method 1300 of work order generation. Client requirements are gathered (1302) such as for example vehicle usage, preferred part types such as used, remanufactured, 3$^{rd}$ party or OEM, operation type such as delivery vehicle, long-distance driving, daily driver, or occasional use, and the type of operating environment, such as the geographic location or road conditions (highway, off-road, city) that the vehicle is expected to be exposed to. A client profile can then be retrieved or created (1304) using the received client requirements, as further described in connection with FIG. 16. The profile can be generated front a query form identifying client preferences such as price range, longevity, warranty, brand preferences, and operating conditions. The inspection process of the vehicle can then occur to collect inspection data of how to effect a repair to the vehicle and to identify the type of parts required for service (1306). The parts are identified either by a type of part or a unique identifier of an acceptable part from one or more suppliers (1308). The part identification is further described in FIGS. 14 and 15. Based upon the parts that are matched to the client profile and estimate is generated (1310). The user can then with the repair and may select individual parts if they are provided in the estimate where alternatives are available (1312). A work order identifying the selected parts from the associated supplier (1314) is generated and the associated parts can be reserved ordered. The selection can be also captured as sales data (1320) to provide part sales loss analytics and part prediction. The work can then be performed by the service center on the vehicle (1316). In subsequent servicing of the vehicle part wear performance can be collected and associated with aspects of the client profile (1318). The wear performance may identify part failure, if a party still performing at expected levels, or any additional ancillary part failures associated with the originally replaced part. This data can then be provided for additional processing as shown in FIG. 17 to generate a part performance profile which can be associated with one or more vehicle types for models.

Figure 14:
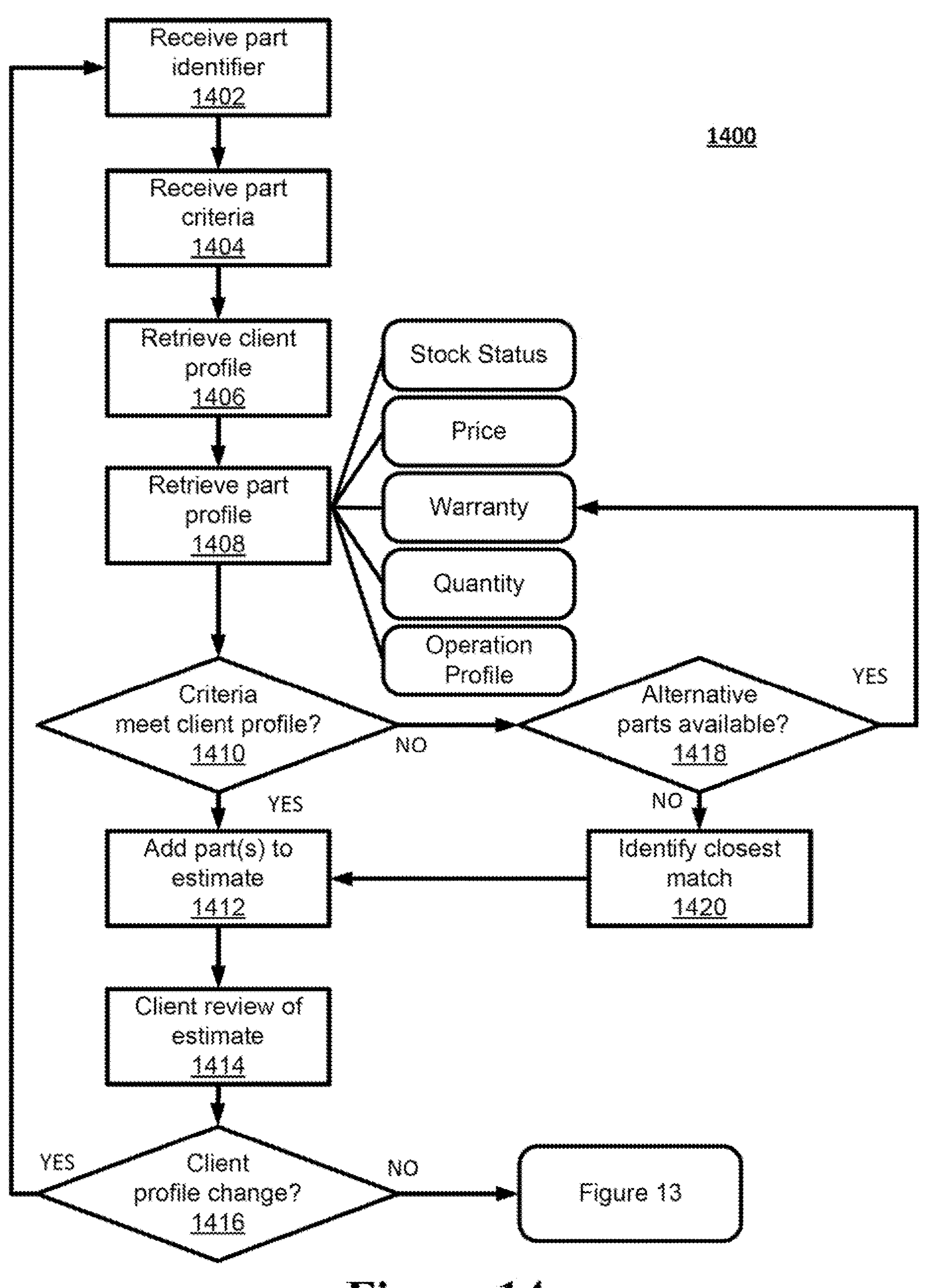
FIG. 14 depicts a method of part selection.

FIG. 14 depicts a method 1400 of determining parts for a work order based upon client profile and part profiles. A pan identifier is received (1402) by an estimate generation module. Part criteria may also be received (1404) which identifies the type of parts that may be used in the service such as used, OEM, third-party, or remanufactured. The client profile is retrieved (1406) to determine the usage, performance and price criteria applicable in part selection. A part profile which then matches the part criteria and client profile are retrieved (1408). The part profiles can define stock status of the parts, price, warranty, quantity and operation profiles for the part. For example the operation profile may define operating environment conditions to which the parties suited based upon collective performance data in association with the vehicle type. If the part meets the criteria or associated characteristic in the client profile (yes at 1410) it is added to the parts estimate, if the part does not meet the criteria or associated characteristic of the client profile (no at 1410) the next alternative part or closest match can be determined. If an alternative part is available the part profile is retrieved (1408) and compared to the client profile. For example, the most inexpensive and readily available brake pads may not have an operation profile such as the amount of wear they can sustain which meets the desired client profile and therefore would not be selected. If no alternative parts are available (no at 1418) that meet the client profile within a desired confidence value, the closest available match can be selected (1420). For example, there may be a preferred part that would meet the clients criteria however the delivery times for the part may nor be within the profile parameters. Parts that meet the profile or are the closest matches to the client profile are added to the estimate (1412) which can then be provided to the client for review (1414). The estimate can provide multiple parts from which the user can select their preference. Based upon the review and the part selections the client profile may be modified based upon the client input (1416), for example based upon pricing or availability which would require additional parts to be compared to the profile to determine a more appropriate match. Although the method depicts the processing of individual parts sequentially it would be understood by a person of ordinary skill in the art that the processing of multiple parts may be processed in parallel or filtered based on the various criteria.

Figure 15:
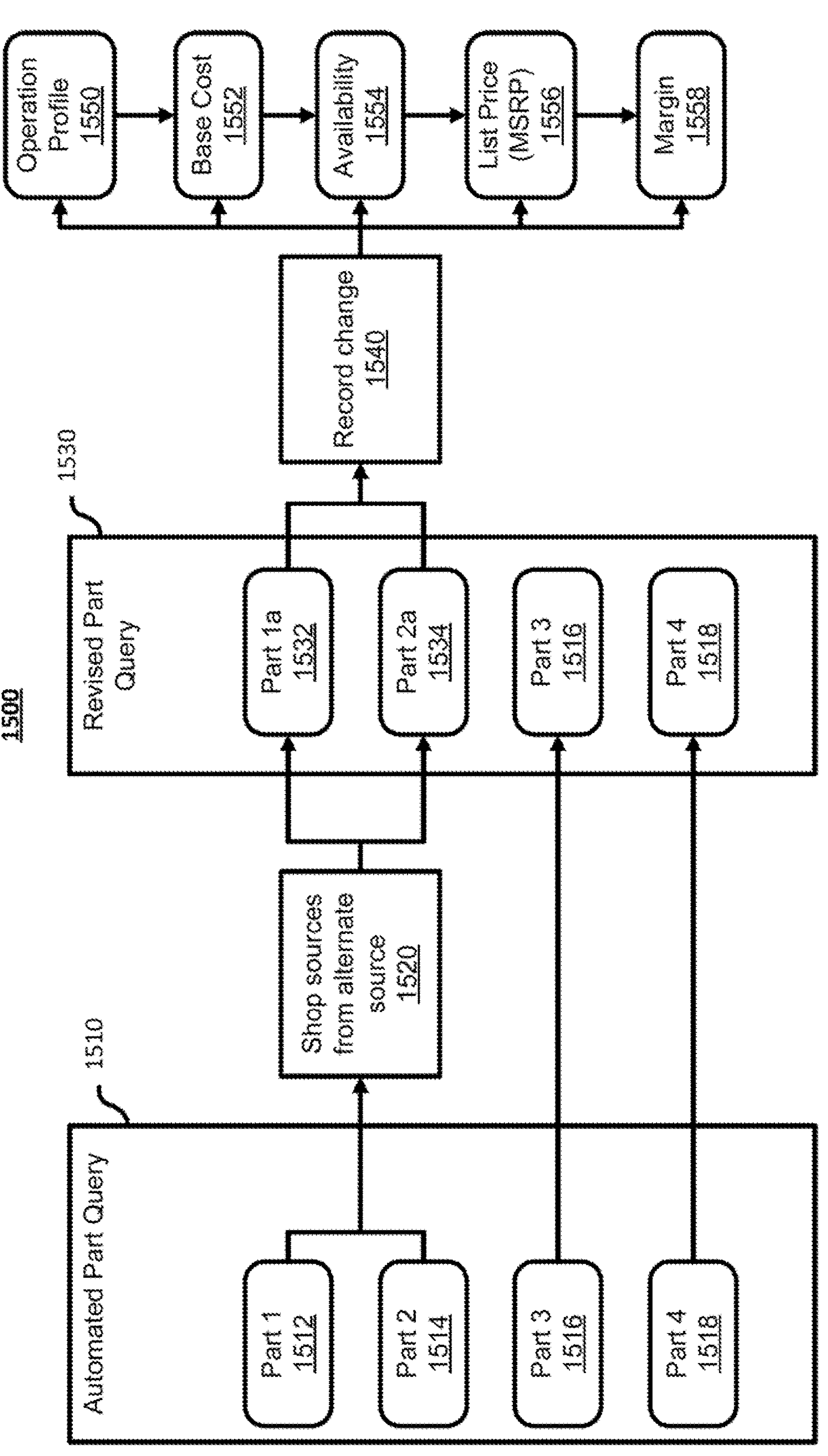
FIG. 15 depicts a method of alternate part selection.

FIG. 15 depicts a process 1500 of parts selection. The automated query process (1510) may have multiple part identifiers such as part 1 1512, part 2 1514, part 3 1516, and part 4 1518. Specific parts may be associated with certain suppliers available to the service center for ordering. If the parts are not available at a preferred supplier, alternate sources can be determined (1520) and the part identifier can be revised to identify part **1*a* 1532 and part 2*a* 1534. The changed parts are recorded (1540) and an associated profile can be created identifying operation profile 1550, base cost 1552, availability 1554, list price (MSRP) 1556, and profit margin would be provided to the service center 1558**

Figure 16:
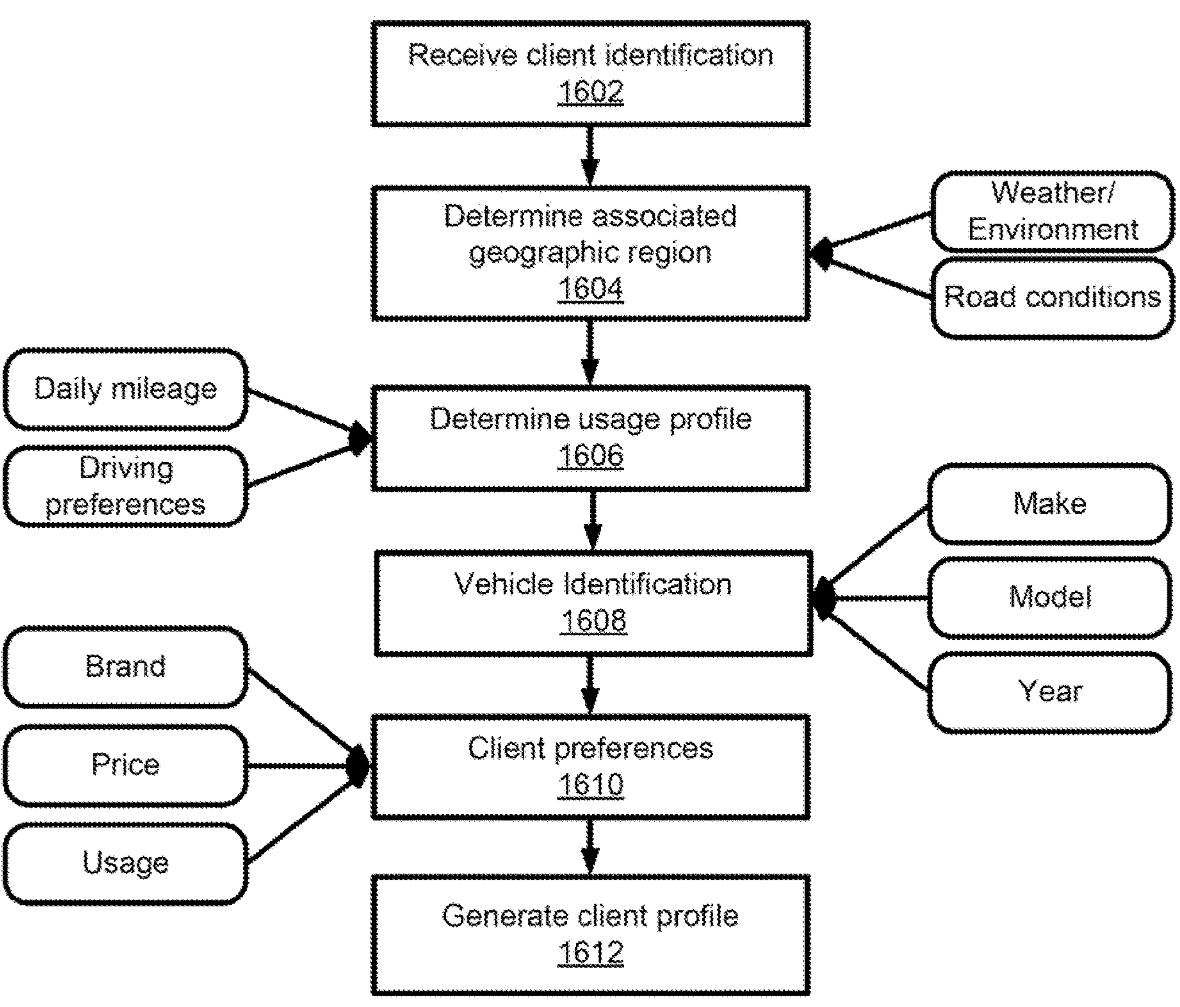
FIG. 16 depicts a method of client profile generation
Figure 17:
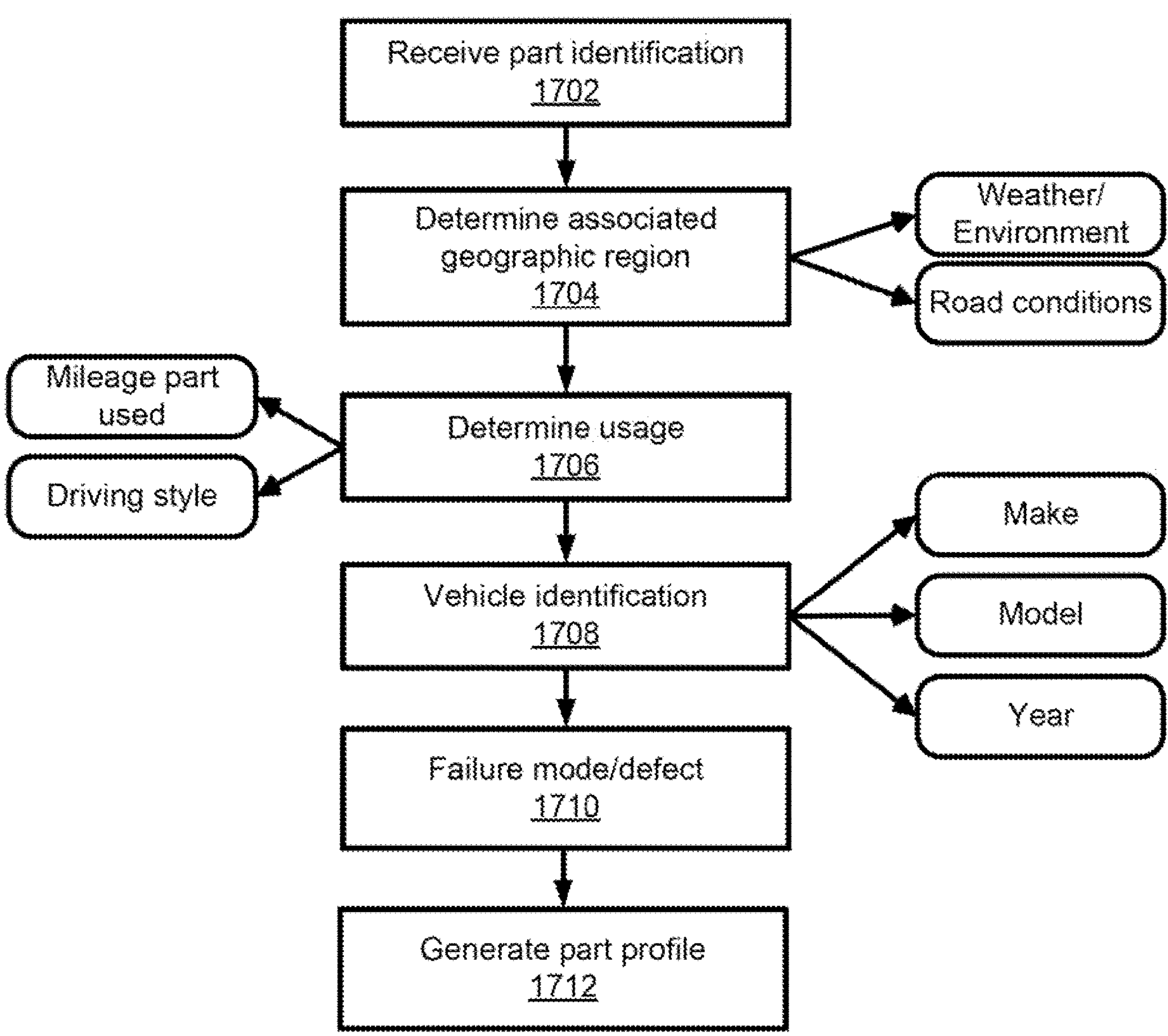
FIG. 17 depicts a method of part profile generation.

FIG. 16 depicts a method 1600 of client profile generation. A client identifier is received (1602) and can be associated with the geographic region (1604), a particular operating environment, or encountered whether or road conditions. The usage profile, how the client will use the vehicle, such as daily mileage, driving style or driving preferences can be identified by client (1606) and associated with a vehicle identifier (1608) such as the make, model and year of the vehicle. Client preferences also be collected (1610) and defined a characteristics such as brand preferences price range of price sensitivity and desired longevity of the part user may also define brand preference and stored in an associated client profile can then be stored (1612).

FIG. 17 depicts a method 1700 of generating parts profile. Part identifier is received (1702). A geographic region or operating environment (1704) are determined and associated with a usage profile (1706) such as how long the part was used for the mileage that the part was used for or the driving style which the part was exposed to. The vehicle at the part was used on can also be identified (1708) and a failure mode (1710) which may also identify extenuating factors that may have resulted in or contributed to the failure. The profile can then be generated (1712). Subsequent inspection data received from different service centers can be used to update the parts profile to include different vehicles usage profiles and it an regional attributes. The failure mode may be a numeric value such as a mean time between failure, percent of expected performance achieved, or associated with the mileage.

Figure 18:
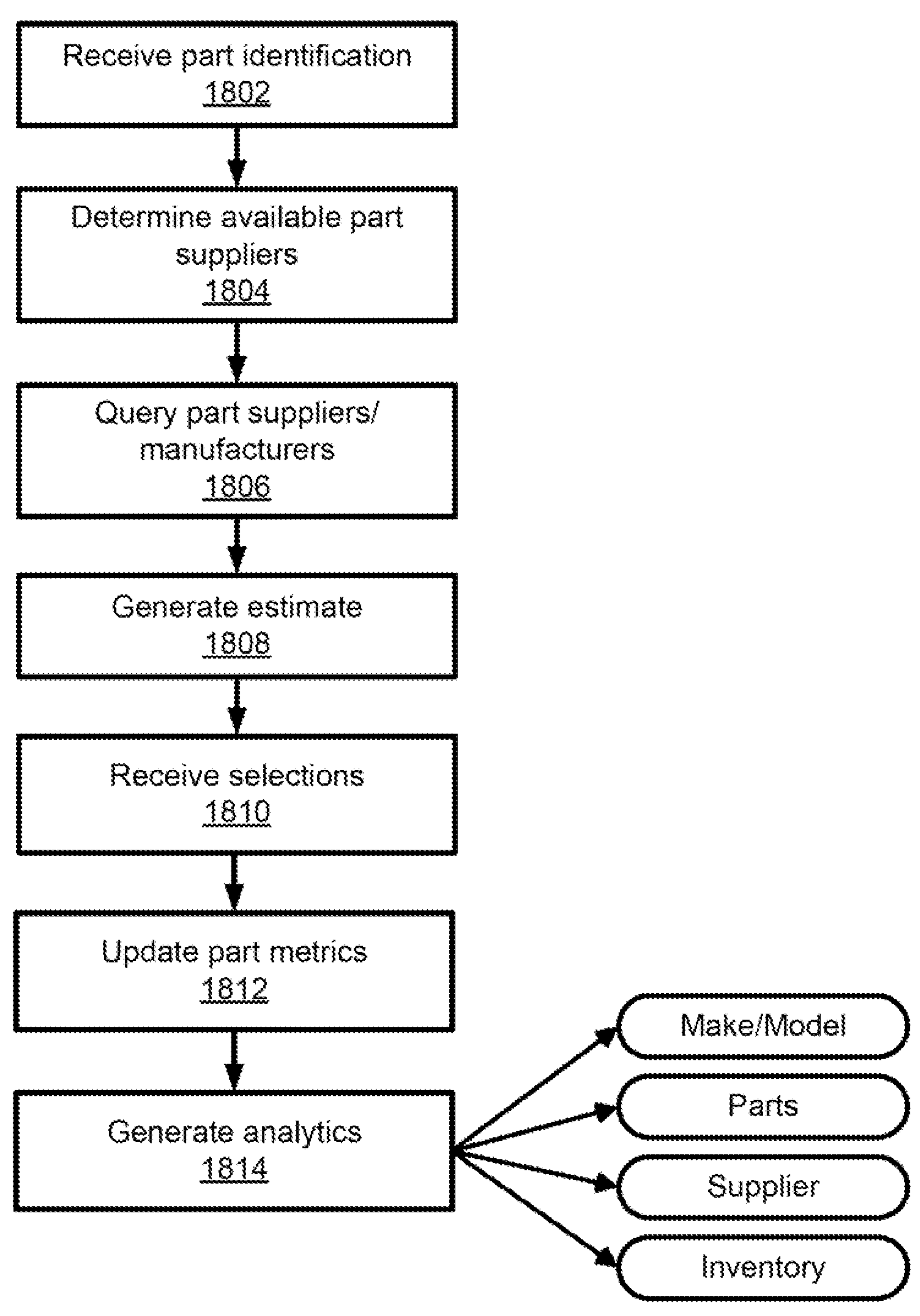
FIG. 18 depicts a method of part supply analytics.

FIG. 18 show a method 1800 of sales performance measurement. When a work order is generated part identifiers are received (1802) at the server. The system will determine which suppliers has an appropriate part available (1804), and/or comparable part which meets the client profile criteria. The part suppliers are queried (1806) for part information. The received part options are incorporated to the work order estimate (1808). The client selections are then received (1810) and the identified parts can be ordered or reserved, and the metrics associated with the parts in the quote, selected and unselected are updated to identify which parts were used or not used and characteristics which were utilized to determine the part selection (1812). For example, metrics associated with the parts that were presented in the order can be updated, for example part "A" was selected over part "B", or the selection of part "A" required the selection of part "C". The metrics may also capture that the part selected was only available from supplier "4", whereas preferred supplier is supplier "1". Sales analytics (1814) can then be generated to generate measures of lost sales, aggregate vehicle repair trends, part preferences, supplier performance and inventory trends.

Based on the client's profile, the system queries from 3rd party software connections provided by suppliers or distributers to aggregate data. This occurs in real-time in which the platform gathers data such as Part Line codes, part numbers, pictures, descriptions, cost price, list price, inventory levels, WHIMIS (Workplace Hazardous Materials Information System), warranty. UPC/EAN numbers and other relevant information from the supplier. When a purchaser does not purchase a part from a certain supplier but from another, this is what is known as a lost sale. Estimating a certain repair is not considered a lost as no purchase of a part has been done. Lost sales are broken down into and non-exhaustive list of several categories:

1) Quality
2) Price (List Price, Cost Price, Margin)
3) Availability
4) Warranty
5) Brand preference
6) OE Manufacturer Only Parts Currently, parts suppliers have no way of measuring lost sales unless someone was to query a specific part from a supplier and such supplier did not have the part in stock or chose to purchase it from a different supplier. At this point, the supplier would have to manually record the lost sale should the purchaser say they would have bought this specific part. It is common practice in the industry to simply offer what is available and generally of like in kind parts. The purchaser would not declare the lost sale as there are no benefits to them. Most purchaser of parts do not tell the supplier they lost the sales. It is time consuming and most supplier are limited in their ability to monitor that information.

Subsequently, the present system can provide lost sales data for virtually any quantitative unit of data relating to the part. That said, the system can provide an accurate predictive model of the suppliers lost sale from their competitors, inventory levels, and future inventory levels.

Price is often the major factor a purchaser would buy a certain part. An example would be; purchaser queries multiple suppliers for part 4123. Supplier "A" sells part #123 for "X" dollars. Supplier "B" sells the same part for "Y" dollars. If the purchaser was to buy part #123 from supplier "A" because he had the better price. Supplier "B" would never know that he has lost the sale due to price. This metric cannot be measured without querying parts from both suppliers and documenting them simultaneously. The system queries all suppliers for In-Kind parts which allow us to provide novel data currently non-existent in present systems. Within these measures, price can be replaced with margin which is the profit between cost and list price. List price is w here a purchaser chooses a higher or lower list price. Often these service centers sell their parts at the suggested list price. It is often found that a supplier will choose a lower list price to lower the invoice for a client however the cost might be the same as the part with a higher list price. Also, it could have a higher cost price yet the list price being lower and still the chosen part.

When a repair shop installs an original manufacturer part, these part numbers are aggregated to identify defect trends. This is also another lost sale metric that is currently unavailable as the suppliers operate at arm's length from the installers (repair shops). Shop rarely submit their OE (original equipment) pans purchases to the aftermarket suppliers thus making such aftermarket supplier unable to know what parts they should get into production. Furthermore, OE manufacturers do not disclose their part sales. The present system can track the repair and use of OE parts. As such, a recommendation of development of a trending part that is currently unavailable in the aftermarket can be made. This is also confirmed as the system would have attempted to query from the aftermarket suppliers first.

When a client has profiled to a preference to quality parts, the ability to query suppliers for a specific part quality becomes prevalent. If a specific supplier does normally stock quality parts the present system can establish that a purchaser tends to purchase a certain brand over another. There could be several reason for this (habit, preference, availability, price . . . ) but what can be determined is a brand of preference. If a purchaser choses to go outside his normal supplier to purchase a specific branded part, it can now be shown a supplier that it should consider stocking that brand. Example; repair shop normally buys most of their parts from supplier "X", today, a vehicle comes in and needs a battery.

Instead of buying the battery from the normal supplier, the repair shop calls another supplier to specifically get an "X" brand battery. Another car comes in and also needs a battery and although the regular supplier has one for less, the repair shop calls the other supplier and gets "X" brand battery although it cost more. From the analysis it can significantly say that the specific brand is primarily the reason of purchase.

This unit of lost sales is more qualitative unit of measure in connection with a warranty. The system can determine if a purchaser chooses a warranty and should they chose the part with better or worst warranty and continues to do it over a sustained period and for different vehicles, it can be inferred that warranty is the cause of the lost sale. Example: supplier "X" offers part "A" with a lifetime warranty for $10. Supplier "Y" offers part "A" with a 5-year warranty for $10. Shop purchases from supplier "X" for the warranty.

Alternatively, if a shop buys from Supplier "Y" because they are loyal to that supplier, but when they require part "A", they chose supplier "X". This is very similar to brand preference.

Regarding futures inventory levels, the current method to predict sales is done through vehicle geographical pooling. A supplier can aggregate data from the Motor Vehicle Registry and determine their potential market penetration. As an example, in city "X", there are 300,000 vehicles ranging from year 2000 to 2020. It is expected that for vehicles of the years 2018 through 2020, will unlikely be serviced by the aftermarket service centers and aftermarket suppliers. The suppliers estimate they will see "X" of a specific vehicle make and model and assume a market penetration for certain parts (brakes, suspension, maintenance parts, etc.). They look for historical patterns from previous sales and determine an acceptable inventory. The accuracy of the predictive model has a regression model with a R value between 0.17 and 0.22.

The modelling does not predict parts based on potential vehicle pool of a geographical area but is based on actual vehicles in service in the shops that are buying parts. This allows for predicting parts inventory level and lead time of manufacturing by the analytics component 1938. For example, the system can identify there are "X" amount of Hyundai™ Elantra™. Given aggregated repair trends from actual repairs over a period. For example if the Hyundai Elantra is prone for ball joint failure at 80,000 km, within the service pool of vehicles, it can be determined that within a geographical area, there are a number of Hyundai Elantra coming up to the 80,000 km range, the system can accurately predict that supplier "A" should stock "X" quantities of these ball joints. This allows them to have inventory at the right time for the sale to occur.

Lead times for production of a parts can be as long as 8 months before they make their way to a supplier's shelf. Knowing that the aforementioned example is occurring, knowing that these Hyundai Elantra's will get to the 80,000 km in the next year, a lead time cat be established, for example of 6 months before sales rise. The system provides the ability to predict the required parts for a certain time makes this predictive model to have an R value of 0.49 to 0.59 (statistically significant).

Figure 19:
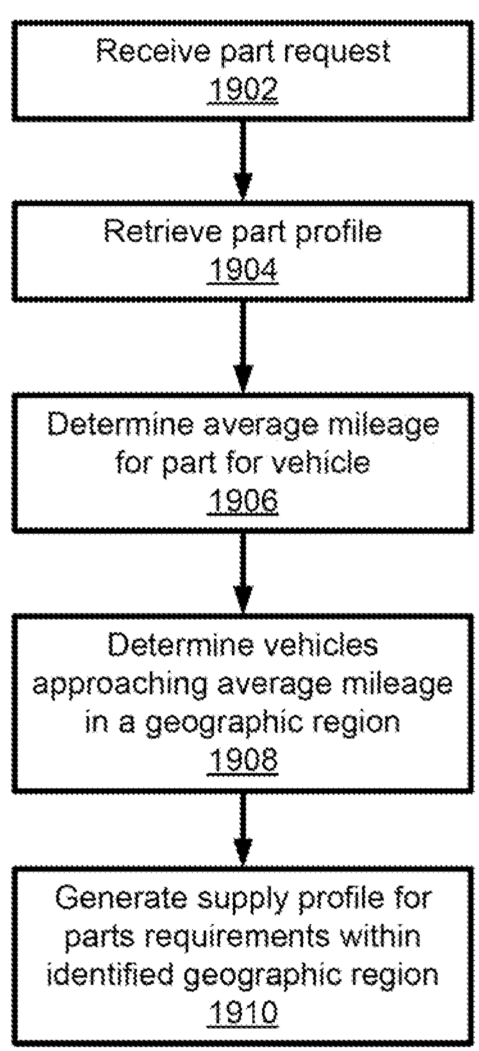
FIG. 19 depicts a method pan supply estimation.

As shown in FIG. 19, the method 1900 when a parts request is received from a service center (1902) the part profile can be retrieved (1904). From the part profile and vehicle histories associated with a part profile an average failure mileage can be determined (1906). The average failure mileage can also be determined based upon make and model of the vehicle within the geographic region. From each defined geographic region vehicles approaching the average mileage based upon their service history can be identified (1908) and a supply profile can then be generated of the potential parts that may be required within a geographic area, or areas associated with a supplier can be made (1910) to provide a lead time or production estimates for a given period.

Figure 20:
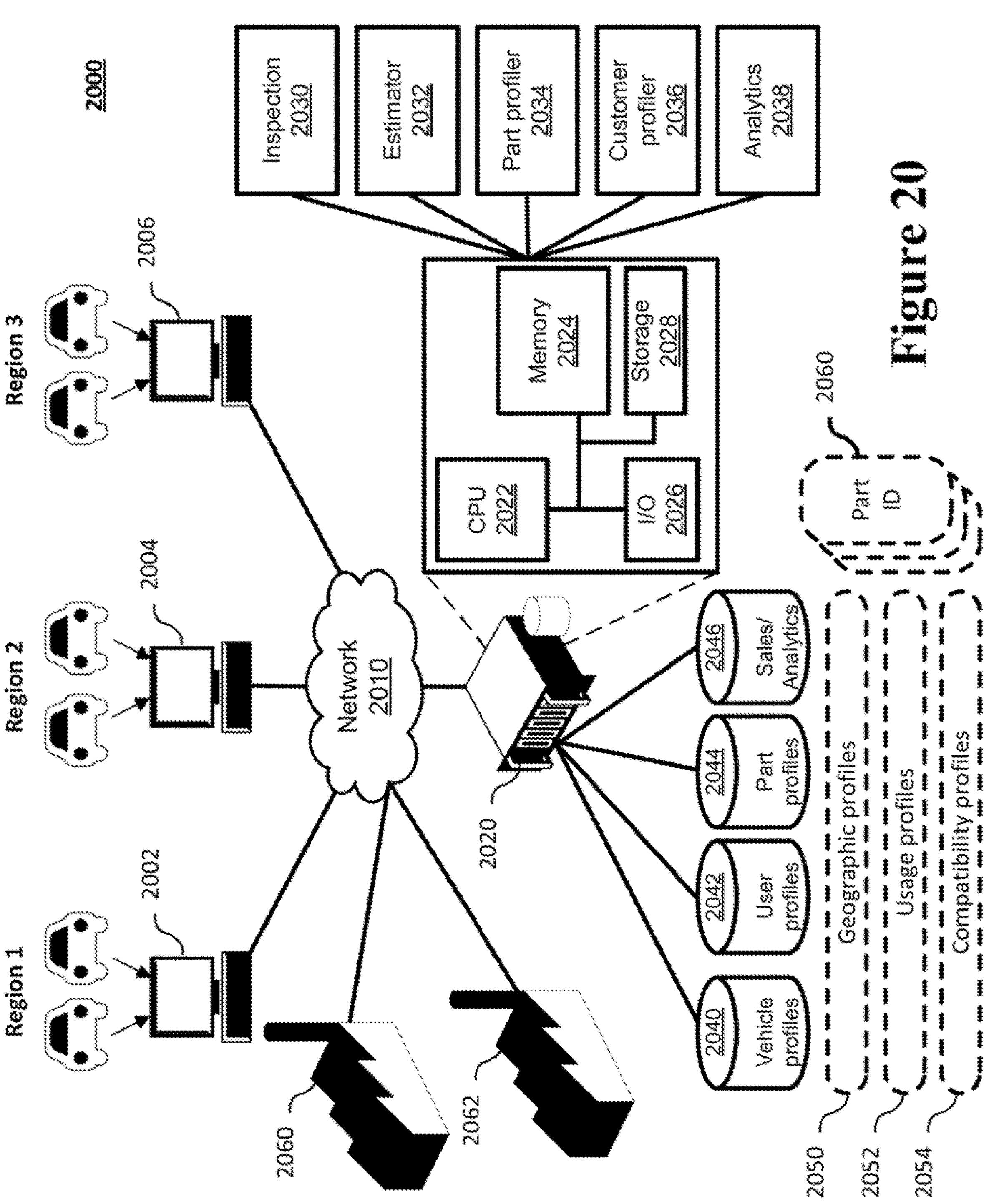
FIG. 20 depicts a system of context based parts selection.

FIG. 20 depicts a system of context based parts selection. The system 2000 enables data to be collected from different regions by for example a first service center 2002, a second service center 2004, and a third service center 2006 each associated with different perspective region the service centers communicates via network 2010 such as the Internet to a processing server 2020 which maintains vehicle profile data 2040, user profiles 2042, part profiles 2044, sales data 2046 and may also include part inventory for one or more associated suppliers or manufacturers 2060/2062. For each part identifier 2060 each of the profile databases can be associated with geographic region profiles 2050, usage profiles 2052 and compatibility with a particular vehicle 2054 or other parts. The processing server 2020 comprises at least one CPU 2012 coupled to an input/output interface 2026 for receiving data input and communicating via one or more networks. A memory 2024 is coupled to the CPU 2022 containing modules for execution of the system. Executable code which is stored on a storage device 2028 contains instructions to provide the modules such as collecting inspection data 2030, estimate generation 2032, part profiler 2034 and customer profiler 2036. The analytics modules 2038 utilizes parts selections and supplier mapping to determine part performance part sales loss analytics, inventory requirements and parts margin. Additional data sources of parts information may be hosted by one or more servers 2040 and may be identified as alternative parts sources or suppliers to which profiles can be generated.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software. Firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable cede.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

The invention claimed is:

1. Non-transitory computer-readable medium containing instructions thereon, the instructions when executed by a processor of a server performing steps comprising:

receiving through a network at the server an electronic inspection report associated with a vehicle repair to be performed on a vehicle, the electronic inspection report comprising electronic inspection report data including at least (i) one or more service package descriptors and (ii) one or more part identifiers or part descriptors being in a non-standardized format across a plurality of service centers due to differing service-packing naming conventions;

parsing the electronic inspection report data and converting at the server the electronic inspection report data into a standardized inspection data structure and retrieving at the server an electronic client profile identifying client preference metrics associated with the vehicle repair, wherein the client preference metrics in the electronic client profile comprises quality, performance, price, warranty, availability, a geographic client profile, client vehicle usage profile, a client vehicle identification, brand preferences, and operating conditions;

automatically identifying at the server one or more vehicle parts required to effect the vehicle repair, the one or more vehicle parts retrieved from the converted electronic inspection report data associated with the vehicle repair and converted at the server to a standardized format and querying through the network a parts profile database identifying for each of the one or more vehicle parts a geographic part usage profile, operational usage profile, vehicle compatibility, price and failure conditions;

wherein for each of the identified one or more vehicle parts:

retrieving, from the parts profile database, parts profiles compatible with an associated vehicle part of the one or more vehicle parts, wherein the geographical part usage profile, the operational usage profile, the vehicle compatibility and the failure conditions of the part are mapped to the geographic client profile, the client usage profile, the client vehicle identification, and the client preference metrics of the client profile;

determining a plurality of associated supplier part identifiers from the retrieved parts profiles having a compatible parts profile and closest matching the client profile by using a supplier mapping data structure that correlates standardized part identifiers to supplier-specific part identifiers; and confirming availability of the vehicle part associated with the supplier part identifiers by simultaneously querying through the network a plurality of remote supplier databases associated with the supplier part identifiers, the remote supplier databases having different data formats than one another and including vehicles compatible with the supplier part identifiers;

receiving from the plurality of remote supplier databases, supplier responses in the different data formats and normalizing the supplier responses into a standardized part-option data structure including at least part line codes, part numbers, inventor levels, warranty, and pricing data for each supplier part identifier;

generating, at the server, an electronic estimate presenting in a standardized data format based on the standardized part-option data structure the supplier part identifiers associated with the identified one or more vehicle parts and confirmed to be available, and transmitting the electronic estimate to a client computing device through the network;

displaying on the client computing device the estimate including the one or more vehicle parts based upon the client profile;

receiving selection from the client computer computing device of a subset of the supplier part identifiers through the network from the client computing device;

modifying the client profile based upon the selection of the subset of supplier part identifiers, wherein the client profile is modified to reflect selections which impact client preference metrics; and simultaneously with the modifying:

generating an electronic work order from the selected subset of supplier part identifiers for transmission to and display on a first enterprise computing device; and updating, at the server, the parts profile database with aggregated collected performance data metrics associated with the one or more vehicle parts replaced on the vehicle by an associated supplier part identifier, the aggregated collected performance data metrics being stored in a parts profile comprising a plurality of part metrics including geographic region, failure mileage, vehicle brand and model, and failure conditions, and data identifying the respective selection of the subset of supplier part identifiers and data identifying one or more supplier part identifiers not selected by the client; and initiating, at the server and through the network, an electronic order for the identified one or more vehicle parts associated with the selected subset of supplier part identifiers from one or more of the plurality of supplier databases; and determining a number of compatible vehicles in a given geographic region predicted to be approaching the associated failure mileage for the one or more vehicle parts derived from the aggregated collected performance data metrics, wherein the determination is based on service history and vehicle characteristics and predicting an associated number of required parts in a defined timeframe;

and after the determining, generating a supply profile for the one or more vehicle parts identifying parts available in the geographic region and a predicted number of required parts based on the number of compatible vehicles within the geographic region predicted to be approaching the associated failure mileage; and generating a lost sales report for the one or more vehicle parts not selected for a plurality of work orders and identifying the client preference metrics used to determine part selections; and transmitting, through the network, at least a portion of the lost sales report or the supply profile in a standardized electronic format for display on a second enterprise computing device associated with a supplier corresponding with one or more supplier part identifiers not selected by the client.

2. The non-transitory computer-readable medium of claim 1 wherein the estimate comprises at least two supplier part identifiers, wherein one of the two supplier part identifiers is selected.

3. The non-transitory computer-readable medium of claim 1 wherein a closest match is selected when it is determined that the part profile does not contain a metric matching a characteristic to the client profile.

4. The non-transitory computer-readable medium of claim 1 further comprises receiving performance data comprising identification of failure conditions or defect associated with the part and an associated vehicle.

5. The non-transitory computer-readable medium of claim 1 further comprising storing, in an associated part profile, identification of a second subset of the supplier part identifiers in the associated part profile that were not selected for the work order wherein the second subset of supplier part identifiers is stored in associated with one or more client profile characteristics used to determine part selection.

6. The non-transitory computer-readable medium of claim 1 wherein determining for each of the identified one or more vehicle parts associated supplier part identifiers matching one or more client preference metrics further comprises comparing at least one part metric retrieved from the part profile.

7. The non-transitory computer-readable medium of claim 1 wherein the supplier parts that are identified are dynamically changed based upon changes to selected client profile characteristics.

8. The non-transitory computer-readable medium of claim 1, further comprising:

retrieving the part profile comprising a plurality of part metrics from a storage device;

determining a vehicle brand and model associated with the retrieved part profile, wherein the vehicle brand and model are determined from previously received performance data;

determining an approximate mileage associated with a failure of an associated part on the vehicle;

determining for a geographic region a plurality of vehicles matching the determined vehicle brand and model and estimating a mileage of the vehicles relative to the determine approximate mileage of the failure; and generating a supply profile identifying one or more subsets of vehicles based upon predicted data which will require the part within a defined time period.

9. A computerized system for electronic work order generation and inventory management to effect a vehicle repair, the system comprising:

a processor;

a networking interface coupling the processor to a network;

a storage device operatively coupled to the processor, the storage device containing data associated with:

a plurality of vehicle part profiles, each of the profiles identifying a plurality of metrics including a geographic region where the part is utilized, usage profiles, associated vehicle brands and models, and failure conditions of the part; and a plurality of client profiles identifying for each client, a geographic client profile, client usage profile, a client vehicle I dentification, and client preferences associated with the client and the vehicle; and a memory coupled to the processor, the memory containing computer readable instructions for maintaining:

an inspection module for receiving inspection data through the network associated with a vehicle to be repaired and generating an electronic inspection report identifying one or more vehicle parts required to effect the vehicle repair, the inspection module further configured to convert the received electronic inspection data from a non-standardized data format into a standardized data format by normalizing inspection data fields for subsequent processing by the system;

a part profiler module for generating the plurality of part profiles based upon inspection reports from the inspection module and a plurality of part supplier data obtained by querying a plurality of supplier databases, the part profiler module collecting aggregated performance data metrics associated with the vehicle part to be replaced on the vehicle by an associated supplier part identifier to a parts profile comprising a plurality of part metrics including a geographic region, a usage profile, a vehicle brand and model, and failure conditions;

a client profiler module for generating the plurality of client profiles based upon a received selection of preferences from a client computing device through the network associated with characteristics to determine part selection;

an estimation module for generating an estimate from the inspection data and an associated vehicle part profile and client profile, and generating the electronic work order by:

receiving through the network an electronic inspection report containing the inspection data associated with the vehicle repair to be performed on a vehicle, the electronic inspection report comprising electronic inspection report data including at least (i) one or more service package descriptors and (ii) one or more part identifiers or part descriptors, the electronic inspection report data being in a non-standardized format across a plurality of service centers due to differing service-package naming conventions;

parsing and converting at the system the, electronic inspection report data into a standardized inspection data structure including standardized service package identifiers mapped from the one or more service package descriptors, and retrieving a client profile identifying the user preferences associated with the vehicle repair, wherein the user preferences comprise quality, performance, price, warranty, and availability;

identifying one or more vehicle parts required to effect the vehicle repair, the one or more vehicle parts retrieved from the standardized inspection data structure;

for each of the identified one or more vehicle parts:

retrieving, from the plurality of vehicle part profiles, parts, profiles compatible with the associated vehicle part of the one or more vehicle parts, wherein the geographical part usage profile, operational usage profile, vehicle compatibility and failure conditions of the part are mapped to the geographic client profile, the client usage profile, the client vehicle identification, and client preference metrics of the client profile;

determining a plurality of associated supplier part identifiers matching a part profile of the plurality of vehicle part profiles to at least one client preference; wherein determining comprises using a supplier mapping data structure that correlates standardized part identifiers to supplier-specific part identifiers;

confirming availability of parts associated with the supplier part identifiers by querying through the network a plurality of remote supplier databases associated with the supplier part identifiers, the remote supplier databases having different data formats than one another and including vehicles compatible with the supplier part identifiers;

receiving, from the plurality of remote supplier databases, supplier responses in the different data formats and normalizing the supplier responses into a standardized part-option data structure including at least part line codes, part numbers, inventor levels, warranty, and pricing data for each supplier part identifier;

generating an estimate presenting in a standardized data format based on the standardized part-option data structure the supplier part identifiers associated with the one or more vehicle parts and confirmed to be available, and transmitting for display the estimate to the client computing device through the network; and displaying on the client computing device coupled to the network the estimate including the one or more vehicle parts based upon the client profile;

receiving from the client computing device selection of a subset of the supplier part identifiers through the network from the client computing device; and modifying the client profile based upon the selection of the subset of supplier part identifiers, wherein the client profile is modified to reflect selections which impact client preference metrics;

generating the work order for transmission to and display on a first enterprise computing device from the selected subset of supplier part identifiers;

updating the parts profile database with aggregated of collected performance data metrics associated with the one or more vehicle parts replaced on the vehicle by an associated supplier part identifier, the aggregated collected performance data metrics being stored in parts profile comprising a plurality of part metrics including geographic region, failure mileage, vehicle brand and model, and failure conditions, and data identifying the respective selection of the subset of supplier part identifiers and data identifying one or more supplier part identifiers not selected by the client;

initiating an electronic order for the identified one or more vehicle parts through the network from one or more of the plurality of supplier databases associated with the selected subset of supplier part identifiers;

an analytics module for identifying vehicle part profile usage trends and generating a supply profile for the one or more vehicle parts identifying parts available in a geographic region, available parts being determined based on a plurality of compatible vehicles within the geographic region matching a particular vehicle brand and model and estimating a mileage of the vehicles relative to a determine approximate mileage of the failure derived from aggregated collected performance data metrics and for generating a lost sales report for the one or more vehicle parts not selected for a plurality of work orders and identifying the client preference metrics used to determine the part selections, and for transmitting at least a portion of the lost sales report or the supply profile in a standardized electronic format for display on a second enterprise computing device of a supplier.

10. The system of claim 9 wherein the inspection module further receives performance data for an associated part on the vehicle, the performance data identifies the failure conditions and mileage associated with the part.

11. The system of claim 9 wherein the estimation module retrieves a selection of a subset of vehicle parts identified in an estimate wherein the selected vehicle parts are associated with a work order.

12. The system of claim 11 wherein the associated parts profile is updated when the associated part is included in the work order.

13. The system of claim 9 wherein the analytics module identifies a second subset of parts not selected for the work order and updates associated metrics in an associated part profile.

14. The system of claim 9 wherein the part profiler module queries a plurality of part suppliers to retrieve part metrics for storage in the associated part profile.

* * * * *